US010614922B2

United States Patent
Milner et al.

(10) Patent No.: US 10,614,922 B2
(45) Date of Patent: Apr. 7, 2020

(54) NON-INVASIVE IN-SITU IMAGING OF INTERIOR OF NUCLEAR REACTORS

(71) Applicant: Los Alamos National Security, LLC, Los Alamos, NM (US)

(72) Inventors: Edward Casteel Milner, Santa Fe, NM (US); Konstantin N. Borozdin, Los Alamos, NM (US); Christopher L. Morris, Los Alamos, NM (US); Haruo Miyadera, Los Alamos, NM (US); John Oliver Perry, Los Alamos, NM (US)

(73) Assignee: Decision Sciences International Corporation, Poway, CA (US)

( * ) Notice: Subject to any disclaimer, the term of this patent is extended or adjusted under 35 U.S.C. 154(b) by 348 days.

(21) Appl. No.: 14/676,636

(22) Filed: Apr. 1, 2015

(65) Prior Publication Data

US 2015/0279489 A1 Oct. 1, 2015

Related U.S. Application Data

(60) Provisional application No. 61/973,779, filed on Apr. 1, 2014.

(51) Int. Cl.
*G21C 17/06* (2006.01)
*G01N 23/04* (2018.01)
(Continued)

(52) U.S. Cl.
CPC ............ *G21C 17/06* (2013.01); *G01N 23/04* (2013.01); *G01N 23/203* (2013.01);
(Continued)

(58) Field of Classification Search
USPC ....................................................... 250/306
See application file for complete search history.

(56) References Cited

U.S. PATENT DOCUMENTS 7,908,121 B2 * 3/2011 Green ..................... G01N 23/20
  702/189
8,275,567 B2 * 9/2012 Lightfoot ................ G01T 1/167
  250/252.1
(Continued)

FOREIGN PATENT DOCUMENTS

JP  H04-076485 A  3/1992
JP  H10-268055 A  10/1998
(Continued)

OTHER PUBLICATIONS

Cremonesi, "Cosmic-Ray Muon Tomography for Anti-Terrorism Applications", MSc Physics, MSc Thesis, Department of Physics and Astronomy, University College of London, Academic Year 2010/2011, pp. 1-87.*
(Continued)

*Primary Examiner* — Phillip A Johnston
(74) *Attorney, Agent, or Firm* — Perkins Coie LLP

(57) ABSTRACT

Techniques, systems, and devices are disclosed for non-invasive monitoring and imaging of nuclear fuel inside a nuclear reactor using muon detector arrays. In one aspect, these detector arrays are placed outside the reactor vessel or building for investigating the reactors without access to the cores, therefore the imaging process is non-invasive. In some implementation, these detector arrays measure both muon scattering and absorption to enable imaging and characterizing not only the very high-Z fuel materials, but also other materials in the reactor, thereby obtaining a more complete picture of reactor status. When applied to damaged reactors, the disclosed proposed techniques, systems, and devices, through the process of providing an image, can reveal the presence (or absence) of damage to fuel rod assemblies or puddles of molten fuel at the bottom of the
(Continued)

containment vessel, thus providing crucial information to guide decisions about remedial actions.

22 Claims, 15 Drawing Sheets

(51) Int. Cl.
*G01N 23/203* (2006.01)
*G21C 17/08* (2006.01)
*G21C 17/003* (2006.01)
*G01F 23/288* (2006.01)

(52) U.S. Cl.
CPC ........... *G21C 17/003* (2013.01); *G21C 17/08* (2013.01); *G01F 23/288* (2013.01); *G01N 2223/625* (2013.01)

(56) References Cited

U.S. PATENT DOCUMENTS

| | | | |
|---|---|---|---|
| 9,268,043 B2* | 2/2016 | DeVolpi | ................ G01T 3/00 |
| 2007/0248239 A1 | 10/2007 | Mahe | |
| 2010/0065745 A1 | 3/2010 | Goldberg et al. | |
| 2011/0170654 A1 | 7/2011 | Bueno et al. | |
| 2012/0312985 A1 | 12/2012 | Morris et al. | |
| 2016/0231455 A1 | 8/2016 | Hayes et al. | |
| 2016/0231456 A1 | 8/2016 | McKenney et al. | |

FOREIGN PATENT DOCUMENTS

| | | |
|---|---|---|
| JP | 2013-217811 A | 10/2013 |
| WO | 2012/167381 A1 | 12/2012 |

OTHER PUBLICATIONS

Miyadera; et. al, "Imaging Fukushima Daiichi reactors with muons", AIP Advances 3, (2013), pp. 1-6 (Year: 2013).*

International Search Report and Written Opinion dated Jul. 29, 2015 for International Application No. PCT/US2015/023936, filed Apr. 1, 2015 (14 pages).

Konstantin Borozdin et al., Cosmic Ray Radiography of the Damaged Cores of the Fukushima Reactors, Physical Review Letters, U.S., American Physical Society, Aug. 9, 2012 vol. 109, 152501-1 ~ 152501-3.

Office Action dated May 22, 2018 in Japanese Patent Application No. 2014-163386, 7 pages.

* cited by examiner

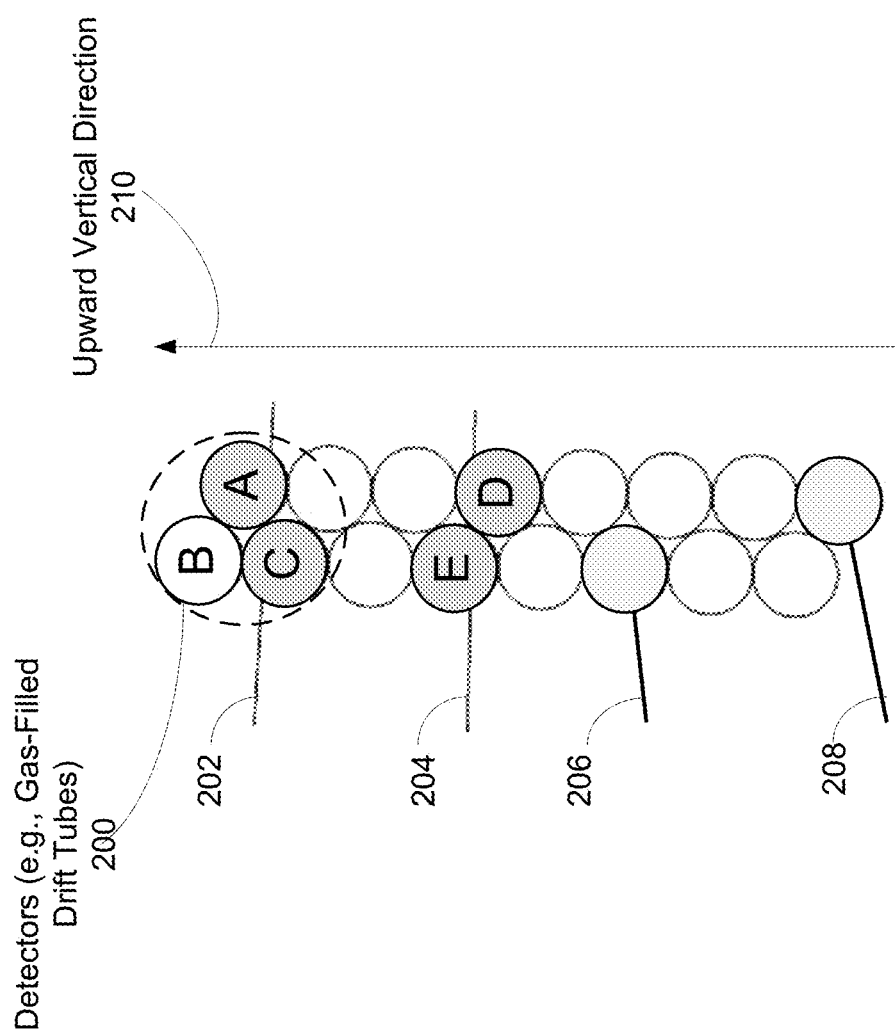

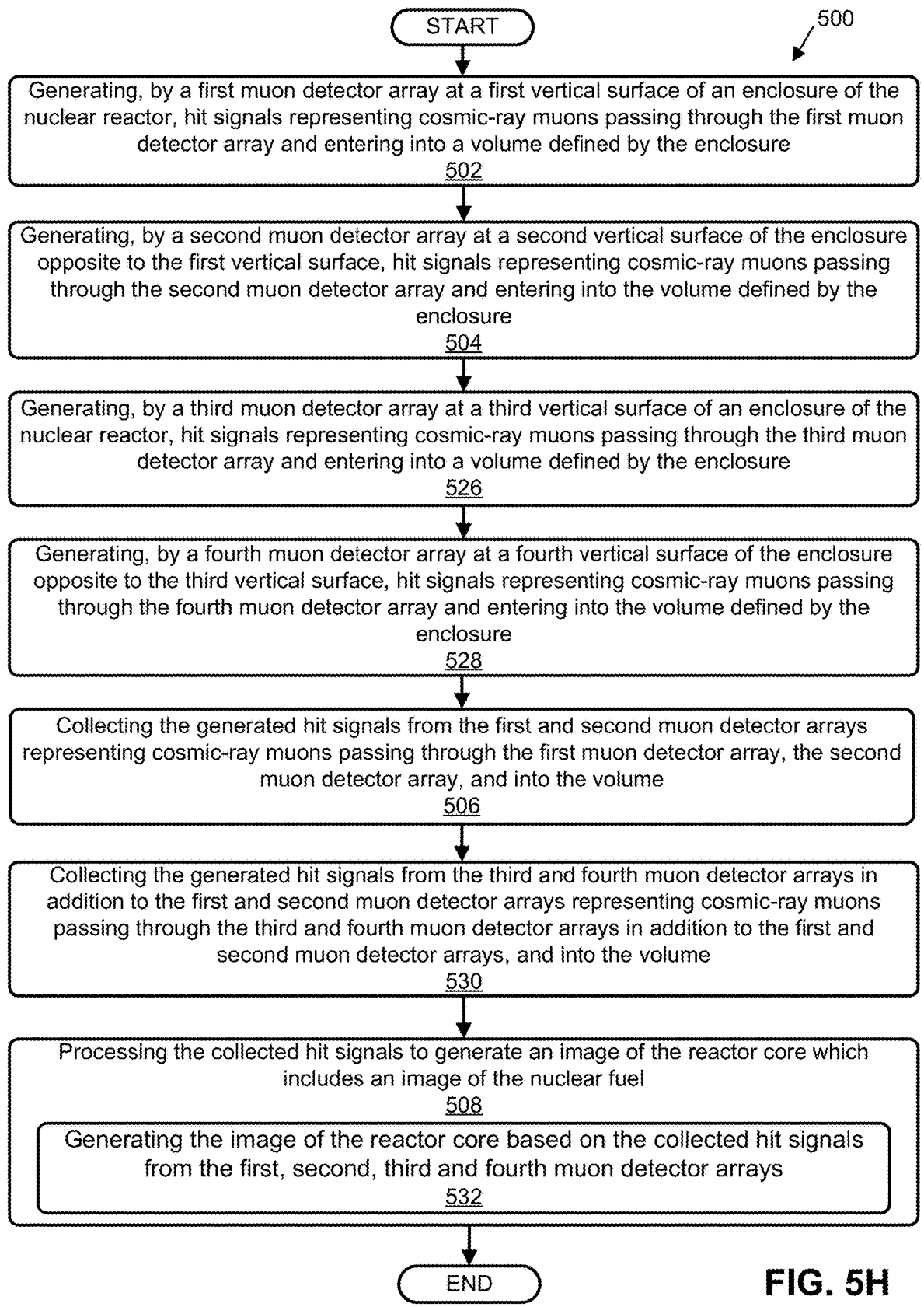

NON-INVASIVE IN-SITU IMAGING OF INTERIOR OF NUCLEAR REACTORS

CROSS REFERENCE TO RELATED APPLICATIONS

This patent document claims priority to and the benefits of U.S. Provisional Patent Application No. 61/973,779, filed on Apr. 1, 2014. The entire content of the before-mentioned patent application is incorporated by reference as part of the disclosure of this application.

STATEMENT REGARDING FEDERALLY SPONSORED RESEARCH OR DEVELOPMENT

This invention was made with government support under Contract No. DE-AC52-06NA25396 between the United States Department of Energy (DOE) and Los Alamos National Security, LLC for the operation of Los Alamos National Laboratory (LANL). The government has certain rights in the invention.

TECHNICAL FIELD

The subject matter described in this disclosure generally relates to systems, devices, and techniques for inspecting or monitoring nuclear fuel inside a nuclear reactor.

BACKGROUND

The health and conditions of cores of nuclear reactors used in nuclear power plants or other applications are critical to public safety and reliable operation of the nuclear reactors. However, it is technically challenging to provide effective monitoring or inspecting systems to monitor the conditions of the inner core of a nuclear reactor through the reactor enclosure and protective mechanisms.

The 9.0-magnitude earthquake followed by a tsunami in March of 2011 caused an ongoing nuclear crisis at Fukushima Daiichi in Japan. Failure of the Fukushima Daiichi reactors is attracting world-wide attention to the issue of the fundamental safety of atomic energy. In spite of the intense effort by Tokyo Electric Power Company (TEPCO) and the Japanese government, the three reactors, units #1, #2 and #3 appear to have some level of melting down. Though the reactors are gradually stabilizing, the detection of Xe from Reactor #2 suggests there is a small but undeniable possibility of re-criticality. The recovery and decommissioning process for a reactor can be unpredictable without some realistic estimation of the amount and location of the melted fuel and the extent of the damage to the reactor. In the 1979 nuclear power plant accident at Three Miles Island in Dauphin County, Pennsylvania, it took more than 3 years before a "quick look" camera could be put into the reactor, and about 10 years before the total damage to the reactor could be assessed.

SUMMARY

Nuclear fuel inside a reactor can be inspected and monitored using visual or photographic techniques, usually through video endoscopy. Video endoscopy can be difficult or impossible to implement when a reactor is damaged because of the risk of radiation release when the endoscope penetrates the radioactive zone. Furthermore, video endoscopy only offers a limited, partial surface view of the fuel location without the identification of the material type and condition; such information may be insufficient for full inspection of the damaged nuclear reactor condition.

Various implementations of the disclosed technology can include techniques, systems, and devices for non-invasive monitoring and imaging of a reactor core, which contains and includes reactor fuel inside a nuclear reactor using charge particle detector arrays, such as cosmic-ray inducted muon detector arrays. In one aspect, a non-invasive imaging system can include the disclosed charged particle detector arrays placed outside an enclosure of the reactor, such as a reactor vessel or building for investigating the reactors without access to the cores. In some implementation, the detector arrays measure both muon scattering and absorption to enable imaging and characterizing not only the very high-Z fuel materials, but also other materials in the reactor, thereby obtaining a more complete picture of reactor status. When applied to damaged reactors, the disclosed proposed techniques, systems, and devices, in the process of providing a detailed image, can reveal the presence (or absence) of damage to fuel rod assemblies or puddles of molten fuel at the bottom of the containment vessel, thus providing crucial information to guide decisions about remedial actions.

In one aspect, a method for non-invasive imaging of a reactor core inside a nuclear reactor with the reactor core containing nuclear fuel is disclosed. The disclosed method includes generating, by a first muon detector array at a first vertical surface of an enclosure of the nuclear reactor, hit signals representing cosmic-ray muons passing through the first muon detector array and entering into a volume defined by the enclosure. The first muon detector array includes muon detectors arranged vertically along a first vertical plane substantially parallel to the first vertical surface of the enclosure. The disclose method includes generating, by a second muon detector array at a second vertical surface of the enclosure opposite to the first vertical surface, hit signals representing cosmic-ray muons passing through the second muon detector array and entering into the volume defined by the enclosure. The second muon detector array includes muon detectors arranged vertically along a second vertical plane substantially parallel to the second vertical surface of the enclosure. The first vertical plane and the second vertical plane are substantially parallel to each other and are at opposite sides of the nuclear reactor. The disclosed method includes collecting the generated hit signals from the first and second muon detector arrays representing cosmic-ray muons passing through the first muon detector array, the second muon detector array, and into the volume. The disclosed method includes processing the collected hit signals to generate an image of the reactor core which includes an image of the nuclear fuel.

The disclosed method can be implemented to include one or more of the following features. For example, the disclosed method can include operating the first and second muon detector arrays to detect primarily near-horizontally-propagating cosmic-ray muons. The disclosed method can include operating the first muon detector array, the second muon detector array, or both arrays to detect cosmic-ray muons entering the volume and cosmic-ray muons exiting the volume. Collecting the hit signals can include reducing contribution of background radiations to the hit signals. The background radiations can include gamma ray radiation. The background radiations can include background radiations generated inside the nuclear reactor, background radiations from an operating environment surrounding the nuclear reactor, or both. Generating the hit signals by the first muon detector array can includes generating the hit signals by at least one of modules in the first muon detector array. The muon detectors in the first muon detector array can be arranged into the modules in the first muon detector array. A given module in the first muon detector array can include two or more of the muon detectors in the first muon detector array. Generating the hit signals by the second muon detector array can include generating the hit signals by at least one of modules in the second muon detector array. The muon detectors in the second muon detector array can be arranged into the modules in the second muon detector array. A given module in the second muon detector array can include two or more of the muon detectors in the second muon detector array. Reducing the contribution of background radiations to the hit signals can include detecting a hit event by the at least one of the module in the first muon detector array, second detector, or both. Reducing the contribution of background radiations to the hit signals can include determining whether the detected hit event is a coincident hit event. Reducing the contribution of background radiations to the hit signals can include rejecting a non-coincident hit event. Determining whether the detected hit event is a coincident hit event can include determining whether the detected hit event includes hits by the cosmic-ray muons in at least two adjacent muon detectors in near coincidence with one another and within a same one of the modules. Determining whether the detected hit event is a coincident hit event can include determining whether at least two adjacent drift tubes are hit by cosmic-ray muons.

The disclosed method can be implemented in various ways to include one or more of the following features. For example, the disclosed method can include generating, by a third muon detector array at a third vertical surface of an enclosure of the nuclear reactor, hit signals representing cosmic-ray muons passing through the third muon detector array and into the volume defined by the enclosure. The third muon detector array includes muon detectors arranged vertically along a third vertical plane substantially parallel to the third vertical surface of the enclosure. The disclosed method can include generating, by a fourth muon detector array at a fourth vertical surface of an enclosure of the nuclear reactor, hit signals representing cosmic-ray muons passing through the fourth muon detector array and into the volume defined by the enclosure. The fourth muon detector array includes muon detectors arranged vertically along a fourth vertical plane substantially parallel to the fourth vertical surface of the enclosure. The third vertical plane and the fourth vertical plane are substantially parallel to each other and at opposing sides of the reactor. The disclosed method can include collecting the generated hit signals from the third and fourth muon detector arrays in addition to the collected hit signals from the first and second muon detector arrays. The disclosed method can include processing the collected hit signals to generate the image of the reactor core which includes the image of the nuclear fuel includes generating the image of the reactor core based on the collected hit signals from the first, second, third and fourth muon detector arrays. The disclosed method can include determining a location of the nuclear fuel inside the reactor core based on the collected hit signals. The disclosed method can include determining a status of the reactor core based on the image of the nuclear fuel. Determining the status of the reactor core can include at least one of determining whether the nuclear fuel is intact; determining whether the nuclear fuel has been displaced; or determining whether the nuclear fuel has at least partially melted. The disclosed method can include identifying a material of the nuclear fuel by: measuring scattering of the cosmic-ray muons entering the volume by the nuclear fuel of the nuclear reactor from the collected hit signals; measuring absorption of the cosmic-ray muons entering the volume by the nuclear fuel of the nuclear reactor from the collected hit signals; and combining the scattering and the absorption of muons to identify the material of the nuclear fuel.

In another aspect, a system for performing non-invasive imaging or monitoring of a reactor core inside a nuclear reactor where the reactor core contains nuclear fuel is disclosed. The disclosed system includes muon detector arrays placed outside an enclosure of a nuclear reactor to detect hit events, and generate hit signals associated with detected hit events. The muon detector arrays includes a first muon detector array at a first surface of the enclosure. The first muon detector array includes muon detectors arranged vertically along a first vertical plane substantially parallel to the first surface of the enclosure. The disclosed system includes a second muon detector array at a second surface of the enclosure opposite to the first surface. The second muon detector array includes muon detectors arranged vertically along a second vertical plane substantially parallel to the second surface of the enclosure. The first vertical plane and the second vertical plane are substantially parallel to each other. The disclosed system includes a signal processor communicatively coupled to the first and second muon detector arrays to collect the generated hit signals from the first and second muon detector arrays representing cosmic-ray muons passing through the first and second muon detector arrays and entering a volume of the nuclear reactor defined by the enclosure. The disclosed system includes an image processor communicatively coupled to the signal processor and configured to generate an image of the reactor core based on the collected hit signals. The image of the reactor core includes an image of the nuclear fuel.

The disclosed system can be implemented in various ways to include one or more of the following features. The first muon detector array, the second muon detector array, or both first and second muon detector arrays can be configured to detect primarily horizontally-propagating cosmic-ray muons. The first muon detector array, the second muon detector array, or both first and second muon detector arrays can be configured to detect cosmic-ray muons entering the volume of the nuclear reactor and cosmic-ray muons exiting the volume of the nuclear reactor. The disclosed system can include a third muon detector array at a third vertical surface of an enclosure of the nuclear reactor. The third muon detector can generate hit signals representing cosmic-ray muons passing through the third muon detector array and into the volume defined by the enclosure. The third muon detector array can include muon detectors arranged vertically along a third vertical plane substantially parallel to the third vertical surface of the enclosure. The disclosed system can include a fourth muon detector array at a fourth vertical surface of an enclosure of the nuclear reactor. The fourth muon detector array can generate hit signals representing cosmic-ray muons passing through the fourth muon detector array and into the volume defined by the enclosure. The fourth muon detector array can include muon detectors arranged vertically along a fourth vertical plane substantially parallel to the fourth vertical surface of the enclosure. The third vertical plane and the fourth vertical plane can be substantially parallel to each other and at opposing sides of the reactor. The signal processor is communicatively coupled to the third and fourth muon detector arrays to collect hit signals from the third and fourth muon detector arrays representing cosmic-ray muons passing through the volume of the nuclear reactor and the third and fourth muon detector arrays. The image processor can generate the image of the reactor core based on the collected hit signals from the third and fourth muon detector arrays in addition to the collected hit signals from the first and second muon detector arrays. The disclosed system can include passive shielding to enclose the detector arrays to shield the detector arrays from background radiations. The signal processor can be configured to reduce contribution of background radiations to the hit signals collected from the first and second muon detector arrays. The background radiations can include gamma ray radiation and other background radiations. The background radiations can include background radiations generated inside the nuclear reactor and background radiations from an operating environment surrounding the nuclear reactor. The image processor can determine a location of the nuclear fuel inside the reactor core based on the collected hit signals. The image processor can determine a status of the reactor core based on the image of the nuclear fuel. The status of the reactor core can include at least one of: whether the nuclear fuel is intact; whether the nuclear fuel has been displaced; or whether the nuclear fuel has at least partially melted. The signal processor can measure scattering of the cosmic-ray muons entering the volume by the nuclear fuel of the nuclear reactor from the collected hit signals; measure absorption of the cosmic-ray muons entering the volume by the nuclear fuel of the nuclear reactor from the collected hit signals; and combine the scattering and the absorption of the cosmic-ray muons entering the volume to identify a material of the nuclear fuel.

In yet another aspect, a system for non-invasive inspecting a damaged reactor core inside a nuclear reactor include charged particle detector arrays placed outside an enclosure of the damaged nuclear reactor to generate charged particle scattering signals representing charged particles passing through the charged particle detector arrays, entering a volume defined by the enclosure, and interacting with nuclear fuel inside the damaged reactor core. The charged particle detector arrays include a first charged particle detector array at a first position outside the enclosure. The first charged particle detector array is arranged in a first vertical plane substantially parallel to a first vertical surface of the enclosure. The charged particle detector arrays include a second charged particle detector array at a second position outside the enclosure opposite to the first position. The second charged particle detector array is arranged in a second vertical plane substantially parallel to a second vertical surface of the enclosure. The first vertical plane and the second vertical plane are substantially parallel to each other. The disclosed system includes a signal processor communicatively coupled to the first and second charged particle detector arrays to collect the generated charged particle scattering signals from the first and second charged particle detector arrays. The disclosed system includes a processor communicatively coupled to the signal processor. The processor can perform operations including generating an image of the damaged reactor core based on the collected charged particle scattering signals. The generated image of the damaged reactor core includes an image of the nuclear fuel inside the damaged reactor. The process can perform operations including analyzing the image of the nuclear fuel to determine a status of the damaged reactor core including at least one of: whether the nuclear fuel is damaged, whether the nuclear fuels has been displaced; or whether the nuclear fuel has at least partially melted.

The disclosed system can be implemented in various ways to include one or more of the following features. For example, the first and second muon detector arrays can detect primarily near-horizontally-propagating cosmic-ray muons. The first and second muon detector arrays can detect both cosmic-ray muons entering the damaged nuclear reactor and cosmic-ray muons exiting the damaged reactor core. The system can non-invasively inspect the damaged reactor core from outside the enclosure of the damaged rector core.

In another aspect, a process for non-invasive imaging and monitoring of a reactor core (including nuclear fuel) inside a nuclear reactor is disclosed. This technique places a first muon detector array on or nearby a first side of the enclosure of the nuclear reactor, wherein the first muon detector array includes muon detectors arranged vertically along a first vertical plane typically parallel to a first wall of the reactor building. This technique places a second muon detector array on a second side of the enclosure opposite to the first side, wherein the second muon detector array includes muon detectors arranged vertically along a second vertical plane, typically parallel to an opposite wall of the building. The first vertical plane and the second vertical plane are substantially parallel to each other. The technique then collects hit signals from both the first and second muon detector arrays. The signals represent muons passing through the volume of the nuclear reactor and each of the first and second muon detector arrays. Next, the technique generates an image of the reactor core based on the collected hit signals, wherein the image of the reactor core includes an image of the nuclear fuel. The technique subsequently determines the location of the nuclear fuel inside the reactor core and a status of the reactor core based on the image of the nuclear fuel.

In another aspect, a system for performing non-invasive imaging and monitoring of a reactor core (which contains nuclear fuel) inside a nuclear reactor is disclosed. This system includes at least one pair of muon detector arrays placed outside the enclosure of a nuclear reactor, wherein the at least one pair of muon detector arrays includes: a first muon detector array on or nearby a first side of the enclosure, wherein the first muon detector array is arranged in a first vertical plane typically parallel to a first wall of the reactor building; and a second muon detector array on a second side of the enclosure opposite to the first side, wherein the second muon detector array is arranged in a second vertical plane substantially parallel to a second wall of the building. The first vertical plane and the second vertical plane are substantially parallel to each other. The system further includes a signal processor coupled to the first and second muon detector arrays to collect hit signals from the first and second muon detector arrays representing cosmic-ray muons passing through the volume of the nuclear reactor and each of the first and second muon detector arrays. The system additionally includes an image processor for generating an image of the reactor core based on the collected hit signals, wherein the image of the reactor core includes an image of the nuclear fuel.

In another aspect, a system for non-invasive inspection of a damaged reactor core inside a nuclear reactor is disclosed. This system includes at least one pair of muon detector arrays placed outside the enclosure of the damaged nuclear reactor, wherein the at least one pair of muon detector arrays includes: a first muon detector array on a first side of the enclosure, wherein the first muon detector array is arranged in a first vertical plane substantially parallel to a first wall of the enclosure; and a second muon detector array on a second side of the enclosure opposite to the first side, wherein the second muon detector array is arranged in a second vertical plane substantially parallel to a second wall of the enclosure. The system also includes a signal processor coupled to the first and second muon detector arrays to collect muon scattering signals from the first and second muon detector arrays representing muons passing through a nuclear fuel inside the damaged reactor core and each of the first and second muon detector arrays. The system additionally includes a processor for: (1) generating an image of the damaged reactor core based on the collected muon scattering signals, wherein the image of the damaged reactor core includes an image of the nuclear fuel; and (2) analyzing the image of the nuclear fuel to determine a status of the damaged reactor core including: if the nuclear fuel is damaged; if the nuclear fuel has been displaced; and if the nuclear fuel has partially, significantly, or completely melted.

BRIEF DESCRIPTION OF THE DRAWINGS

FIG. 2 shows a section of a double-layer drift tube module of a detector array detecting both muon hits and background (e.g., gamma) hits.

FIGS. 5A, 5B, 5C, 5D, 5E, 5F, 5G, 5H, 5I, 5J, 5K, and 5L are process flow diagrams illustrating an exemplary process 500 performed by an exemplary charged particle tomography system.

DETAILED DESCRIPTION

Figure 1A:
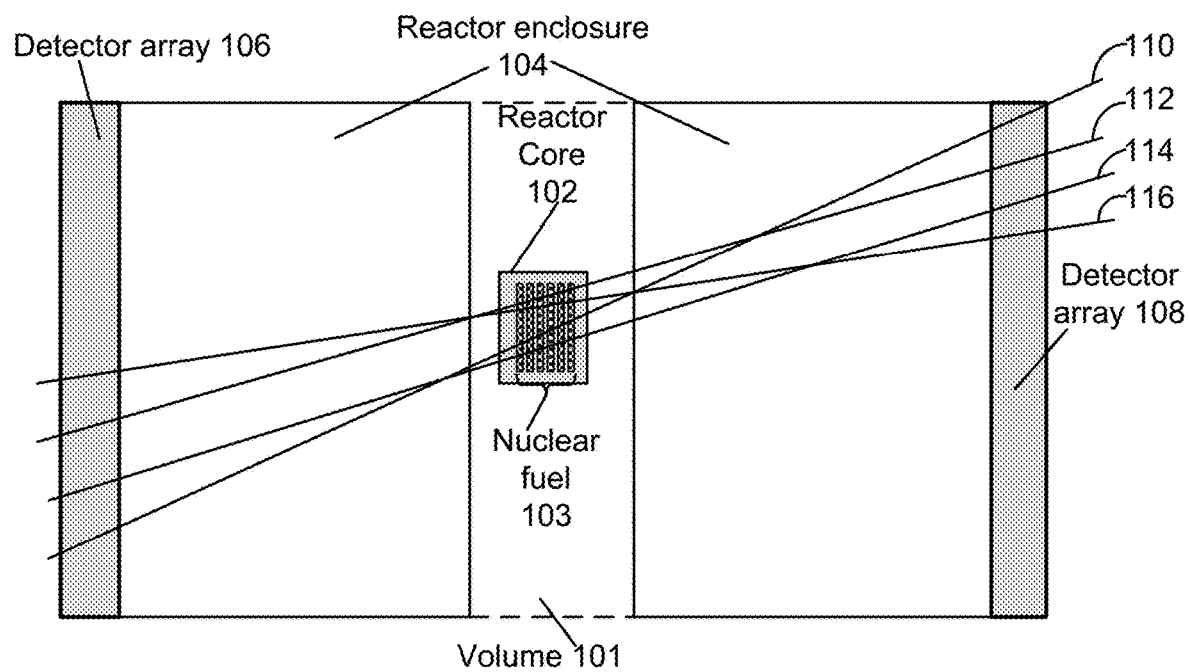
FIG. 1A shows a cross-sectional view of a nuclear reactor and exemplary in-situ charged particle (e.g., muon) detector arrays for imaging a reactor core.

The technology disclosed in this disclosure can be used for non-invasive, in-situ imaging of the interior conditions, including the condition of the nuclear fuel and structural condition of the core of a reactor using muon detector arrays placed around a reactor enclosure. The disclosed technology includes various implementations of charged particle (e.g., muon) tomography that does not require any physical alternation or change to the structural integrity of the enclosures of the nuclear reactor by relying on incident charged particles (e.g., passively produced muons) to obtain images of the interior of a reactor under inspection.

Charged particle (e.g., muon) tomography technology can be used for investigating the reactors based on charged particle (e.g., muon) imaging without access to the cores. In some implementations, a charged particle (e.g., muon) tomography system can be designed to utilize naturally occurring charged particles, such as cosmic-ray muons to image large-scale objects. Cosmic-ray muons are the results of hadronic showers in the upper atmosphere which typically have a flux of $10^4$ muon/min·m$^2$ and an energy of several GeV at a sea level. Muons reach the earth surface because they are relatively long-living and highly penetrating. Muons are typically not attenuated by nuclear interactions, and their range in material is typically limited by the Bethe-Block energy-loss process. These properties make muon radiography (MR) a tool for studying the inner structure of thick and/or dense substances. The MR technique is similar to roentgenography in that the absorption of particles in materials is used to shadow an object.

The disclosed muon tomography technology is an advanced muon tomography that measures multiple Coulomb scatterings of cosmic-ray muons in an object instead of attenuation, an idea that originated with proton radiography. The disclosed muon tomography technique can also be applied to practical applications such as scanning trailer or shipping containers for nuclear materials. The disclosed muon tomography technology can be used to detect the distribution of high-density and high atomic number material in an object to reconstruct a 3-dimensional image which, in this context, may be compared to the 3D images produced in magnetic resonance imaging (MRI).

Various implementations of the disclosed technology can include techniques, systems, and devices for non-invasive monitoring and imaging of a reactor core, which contains and includes reactor fuel inside a nuclear reactor using charge particle detector arrays, such as cosmic-ray inducted muon detector arrays. In one aspect, a non-invasive imaging system can include the disclosed charged particle detector arrays placed outside an enclosure of the reactor, such as a reactor vessel or building for investigating the reactors without access to the cores. In some implementation, the detector arrays measure both muon scattering and absorption to enable imaging and characterizing not only the very high-Z fuel materials, but also other materials in the reactor, thereby obtaining a more complete picture of reactor status. When applied to damaged reactors, the disclosed proposed techniques, systems, and devices, in the process of providing a detailed image, can reveal the presence (or absence) of damage to fuel rod assemblies or puddles of molten fuel at the bottom of the containment vessel, thus providing crucial information to guide decisions about remedial actions.

The disclosed technology including the charged particle tomography system, device, and techniques provide a practical way of producing detailed survey images of each of the reactor cores, including the degree of damages. The generated images illustrating the damage to reactor cores can provide crucial data to guide decisions about remedial actions for each core, which can be highly valuable to commercial operators and vendors of nuclear reactor. For example, core conditions in the several Fukushima Daiichi reactors are likely quite different: in some reactors the fuel may be completely intact, while in others, may be partially melted, and in at least one, significantly melted. For suppliers of nuclear reactors, such images represent a way of assuring quality and proper functioning of their product.

Techniques in muon-based detection can take two forms. The first one, referred to as "muon radiography," generates 2-D images of an object based on muon absorption, analogous to X-ray radiography images. The second one, referred to as "muon tomography," uses muon scattering to reconstruct a 3-D image of a volume of interest. A Multi-Mode Passive Detection System (MMPDS) for charged particle tomography tend to rely primarily on downward-propagating cosmic-ray muons that pass through two detector arrays, one arranged in a horizontal plane above the volume of interest (VOI) and the other in a horizontal plane below VOI. Such an arrangement is impractical to imaging a large, fixed installation such as a terrestrial nuclear reactor enclosure.

The disclosed system and technique implements charged particle (e.g., muon) tomography specifically structured and designed to the imaging of nuclear reactors to obtain interior images of the nuclear reactor, including the location and shape of the nuclear fuel, which is contained inside a nuclear reactor core or simply a reactor core. In one aspect, a system for performing non-invasive imaging or monitoring of a reactor core inside a nuclear reactor, which can contain nuclear fuel, includes charged particle (e.g., muon) detector arrays strategically placed at different positions outside an enclosure of the nuclear reactors to detect primarily substantially or near-horizontally-propagating charged particles, such as muons. For example, a pair of charged particle detector arrays can be positioned at opposite sides of the enclosure. The pair of charged particle detector arrays can include a first muon detector array at a first surface of the enclosure. The first muon detector array can include muon detectors arranged vertically along a first vertical plane substantially parallel to the first surface of the enclosure. The pair of charged particle detector arrays can include a second muon detector array at a second surface of the enclosure opposite to the first surface. The second muon detector array can include muon detectors arranged vertically along a second vertical plane substantially parallel to the second surface of the enclosure. The first vertical plane and the second vertical plane are substantially parallel to each other.

The near-horizontally propagating cosmic-ray muons are detected by the charged particle detector arrays that include at least the two (first and second) detector arrays installed on at least two opposite sides of the reactor enclosure with each detector array is arranged in a vertical plane to intercept the near-horizontally propagating muons. Although the flux of the near-horizontally propagating cosmic-ray muons is considerably lower than that of the downward-propagating cosmic-ray muons, the muon flux in the near horizontal direction on the earth surface is sufficient to enable imaging, given sufficient time to acquire data. The disclosed muon tomography technology can be implemented to determine whether nuclear fuel has been displaced or melted (partially or completely) due to a malfunction. Additionally, the implementations of the disclosed system and technique can extend the muon tracking measurement baseline from a few meters to 100 m or more, based on the actual size of the reactor. Because these detector arrays are placed outside the reactor enclosure for investigating the reactors without access to the cores and without structural alternation or change to structural elements outside the core, the imaging process is non-invasive and maintains the integrity of the reactor.

Figure 1B:
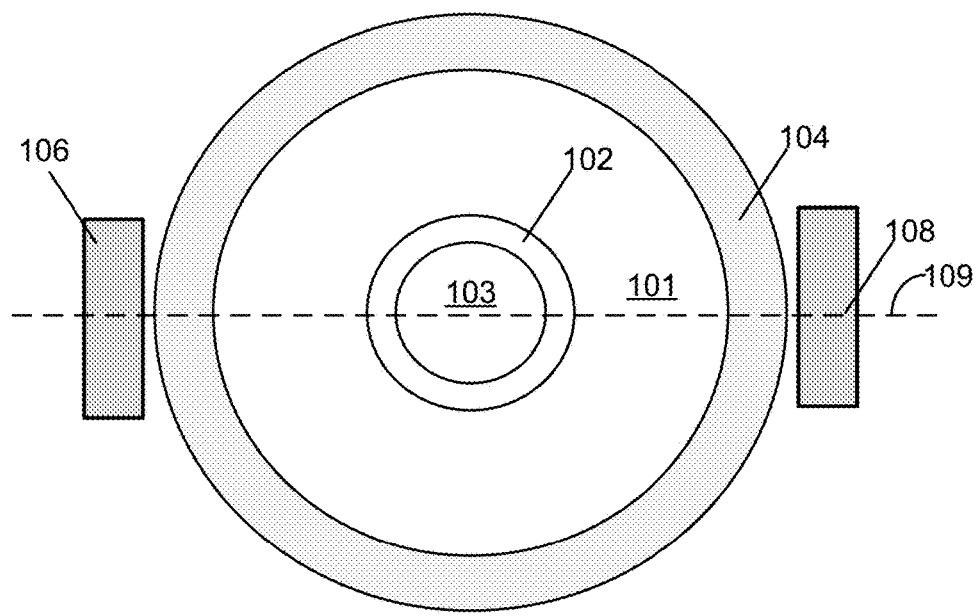
FIG. 1B shows a top-down view of a nuclear reactor and exemplary in-situ charged particle (e.g., muon) detector arrays for imaging a reactor core.

FIGS. 1A and 1B show a cross-sectional view and a top-down view respectively of exemplary in-situ muon detector arrays for imaging a reactor core based on the disclosed technology. FIG. 1A is a cross-sectional view taken along a line 109 shown in FIG. 1B. In this example, the nuclear reactor includes a reactor enclosure 104 formed by enclosure walls such as multiple concrete walls and a reactor core 102 placed inside the reactor enclosure 104. The reactor core 102 contains nuclear fuel 103, which further includes, typically, multiple fuel rods that contain certain high-Z materials, such as uranium and plutonium. Muon detector arrays 106 and 108 for imaging reactor core 102 including nuclear fuel 103 include at least a first vertically-arranged detector array 106 positioned outside the reactor enclosure 104 at a first surface (e.g., left wall) of the reactor enclosure 104 and a second vertically-arranged detector array 108 positioned outside the reactor enclosure 104 at a second surface (e.g., right wall) of the reactor enclosure 104, such that detector arrays 106 and 108 form a pair of opposing detector arrays that are horizontally placed on opposite sides of the reactor for detecting near horizontally propagating muon tracks, such as tracks 110, 112, 114, and 116. Each of the first vertically-arranged detector array 106 and the second vertically-arranged detector array 108 includes an array of muon-detecting detectors that are arranged (e.g., shifted) in position along the vertical direction in a particular configuration. The substantially or near-horizontally propagating muons in combination with the vertically-arranged detector arrays (e.g., 106 and 108), provide a practical solution to the geometry required for generating an image of the nuclear fuel inside the reactor building. The detector arrays 106 and 108 are placed outside the reactor enclosure 104 for interrogating the nuclear fuel 103 in the reactor core 102 without any physical access to reactor core 102 to provide a non-invasive imaging process.

The first and second charged particle detector arrays 106 and 108 can detect near-horizontally propagating charged particles (e.g., cosmic-ray muons) that pass through the detector arrays 106 and 108 and enter a volume 101 defined by the reactor enclosure 104. The charged particles (e.g., cosmic-ray muons) that enter the volume 101 interface with the reactor core 102 and the nuclear fuel 103, exit the volume, and pass through the charged particle detector arrays 106 and 108. The charged particles that interact with the reactor core 102 and the nuclear fuel 103 may scattered by the reactor core 102 and the nuclear fuel 103. The charged particles (e.g., cosmic-ray muons) passaging through the charged particle detectors 106 and 108) and entering the volume can be referred to as "hit events" associated with the charged particles "hitting" individual detectors in the charged particle detector arrays 106 and 108. Individual detectors can be implemented as gas-filled drift tubes, for example. Associated with or responsive to the hit events, the charged particle detector arrays 106 and 108 can generate hit signals indicative of the charged particles hitting the individual detectors. In addition, the charged particle detector arrays 106 and 108 can generate charged particle scattering signals representing charged particles passing through the charged particle detector arrays, entering the volume 101 defined by the enclosure 104, and interacting (e.g., scattering) with nuclear fuel inside the damaged reactor core 102. Moreover, the first and second detector arrays 106 and 108 can detect the charged particles (e.g., cosmic-ray muons) exiting the volume 101 and passing through (hitting) the first and second detector arrays 106 and 108. By detecting the entry and exit of the charged particles, the trajectory of the charged particles including any scattering inside the volume 101 can be detected.

Figure 1C:
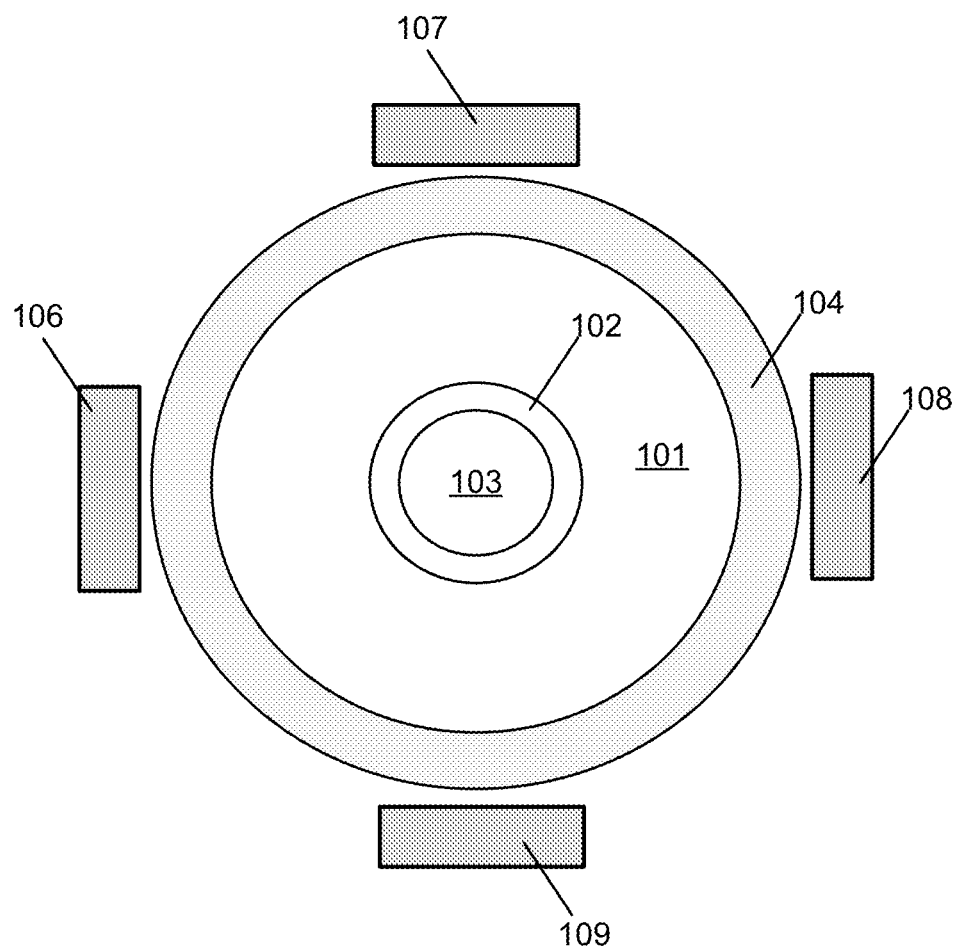
FIG. 1C shows a cross-sectional view of a nuclear reactor and exemplary in-situ charged particle (e.g., muon) detector arrays that include four detector arrays for imaging a reactor core.

In the system configuration in FIG. 1A, the near-horizontally propagating cosmic-rays are largely isotropic azimuthally, that is, they do not have a preferred origin. This is different from the downward-propagating cosmic-rays, where the vast majority of the rays come down from above, with hardly any propagating upward from the earth below. This nature of the horizontally propagating rays and general geometry of the system have multiple consequences. Firstly, it can be useful to arrange more than a single pair of detector arrays on opposite sides of the enclosure. FIG. 1C shows a top-down view of exemplary muon detector arrays that include two pairs of detector arrays for imaging a reactor core based on the disclosed. For example, by surrounding the reactor enclosure with detector arrays from four sides (e.g., using two pairs of opposing detector arrays) may help to generate images of nuclear fuel 102 with shorter data acquisition time, or images with better spatial resolution. As shown in FIG. 1C, third and fourth charged particle (e.g., muon) detector arrays 107 and 109 can be placed at opposing sides of the enclosure 104 of the reactor. The third muon detector array 107 can include muon detectors arranged vertically along a third vertical plane substantially parallel to the first surface of the enclosure. The fourth muon detector array 109 is placed at a fourth surface of the enclosure opposite to the third surface. The fourth muon detector array 109 can include muon detectors arranged vertically along a fourth vertical plane substantially parallel to the third surface of the enclosure 104. The third vertical plane and the fourth vertical plane are substantially parallel to each other.

Secondly, each detector array can detect muons both entering and exiting the reactor enclosure 104. The latter consequence may require enhancement of the data acquisition and processing, which is described below. Thirdly, the separation between a pair of opposing detector arrays, such as arrays 106 and 108, can be 100 meters or more, and the timing synchronization system and process can be modified accordingly.

The specific examples in FIGS. 1A, 1B and 1C show detector arrays 106 and 108 (and 107 and 109) positioned directly against the corresponding wall of the reactor enclosure but other implementations for detector array placement are possible, e.g., providing desired gaps between the detector arrays 106 and 108 (and 107 and 109) and the reactor enclosure 104. Note that exemplary reactor shown in FIG. 1A is not necessarily drawn in scale. An actual nuclear reactor can have a much greater length (e.g., the distance between detector arrays 106 and 108) than both the height of the reactor and the size of the reactor core (e.g., core 102), making muon tracks going through the reactor core (e.g., tracks 110, 112, 114, and 116) nearly horizontal and substantially parallel to one another.

Figure 1D:
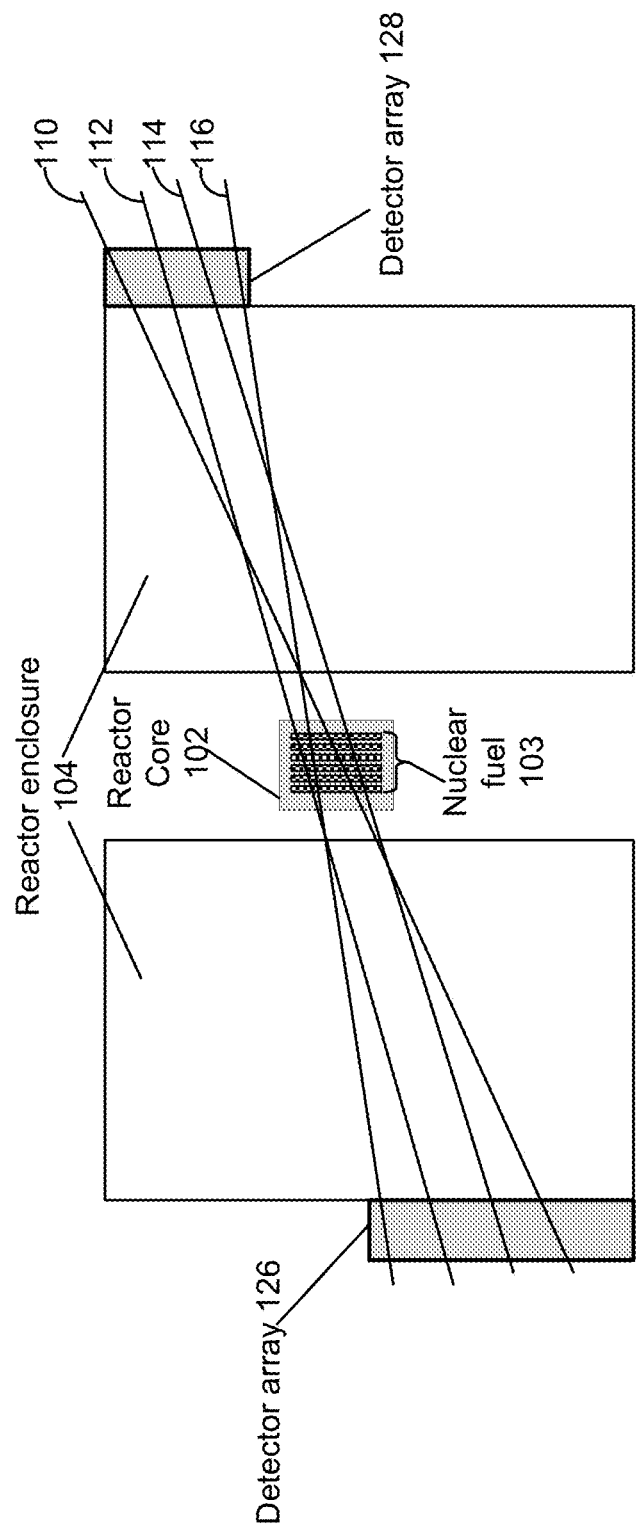
FIG. 1D shows an example of alternative detector arrays installed on the nuclear reactor shown in FIG. 1A.

Also, in the specific examples in FIGS. 1A, 1B and 1C, each of detector arrays 106 and 108 (and 107 and 109) is shown to have the same height as the reactor enclosure, other implementations can use detector arrays having different height than that of the reactor enclosure. In some implementations, each detector array covers only a portion of the reactor enclosure in the vertical direction. FIG. 1D shows an example of alternative detector arrays installed on the nuclear reactor shown in FIGS. 1A, 1B and 1C. As can be seen in FIG. 1B, a detector array 126 is positioned near the left wall of the reactor enclosure and a detector array 128 is positioned near the right wall of the reactor enclosure, each detector array having a respective height just large enough to intercept muon tracks 110-116. These shorter detector arrays replace full height detector arrays 106 and 108 shown in FIG. 1A. In the embodiment of FIG. 1B, the position of each detector array 126 or 128 may be changed (e.g., moved up or down) in the vertical direction to cover a different portion of the respective reactor wall.

In the reactor imaging system and illustrated in FIGS. 1A, 1B, 1C, or 1D, in the vicinity of a damaged reactor, and especially if the reactor containment vessel has been breached, the operating environment may have unusually high background radiation, which can include primarily gamma rays. This background radiation, combined with the fact that each detector array detects energetic charged particles propagating in both directions through the detector array, may adversely affect the detection accuracy in tracking incident muons which are the incident flux that is highly anisotropic and includes muons mostly from above. More specifically, gamma radiation from the reactor can generate a high rate of detections (e.g., "hits" or "hit events") in each detector (e.g., a drift tube) in each detector array. The detectors in a given detector array can be arranged into groups or modules of detectors, with each module including multiple detectors. The number of hits to be detected and handled in the data acquisition and processing pipeline may be so high, as to exceed the capacity of existing data acquisition (DAQ) systems developed for muon tomography.

The high hit rate caused by gamma rays or other background radiations can be mitigated by enclosing the detector arrays inside passive shielding (using, for example, lead or other material that attenuates the flux of energetic charged particles). However, too much shielding may screen out the desired muons, thus reducing image resolution per unit time and extending the time required to attain a specified resolution. Too much shielding also greatly increases the weight of the arrays, making their transport and deployment around the reactor more difficult and costly.

In some implementations, limited passive shielding may be combined with modification of the detector array electronics coupled to the detector arrays, such as field-programmable gate array (FPGA) electronics, and using modified triggering mechanisms to discriminate between background radiation and those muons that are propagating into or out of the reactor enclosure. Using FPGAs in combination with proper triggering mechanisms, the implementations of the disclosed technology can avoid having to implement a massive upgrade of data flow by using more expensive electronics. In some implementations, FPGAs and triggering mechanisms may be able to discriminate between background radiation and desired muons that are propagating into or out of the reactor enclosure without using any passive shielding around the detector arrays. These modifications to a muon tomography system enable performing muon tomography in highly radioactive environment, which otherwise can be extremely difficult with existing detector systems.

In one embodiment, a modified muon tomography system uses a modified triggering program designed to trigger a detector hit only in the event of "double coincident hits" or "multiple coincident hits" within a given module or a sub-module within a detector array. Note that when a muon traverses a detector array it passes through multiple drift tubes in a module and these hit events are correlated. In two-layer modules (i.e., a module having two layers of drift tubes), "double coincident hits" event is detected when two adjacent tubes are hit near the same time.

FIG. 2 shows examples of using double coincident hits to distinguish muon events from gamma and other background events in a vertically-arranged detector array (such as a detector array in FIG. 1A, FIG. 1B, FIG. 1C, or FIG. 1D) having a double layer configuration. Examples of detectors 200 include gas-filled drift tubes. More specifically, FIG. 2 shows a section of a double-layer drift tube module of a detector array detecting both muon hits and background (e.g., gamma) hits in accordance with some embodiments described herein. As shown in FIG. 2, hits in the drift tubes caused by track 202 and track 204 are muon events which activate adjacent tubes in both layers (A and C or D and E) in the double layer structure, which are identified by the signal processing unit of the detector array as double coincident hits. For detector (e.g., drift tube) A in FIG. 2, the two likely double coincident hits are either detectors (e.g., tubes) A and B or detectors (e.g., tubes) A and C.

In contrast, hits in the drift tubes caused by track 206 and track 208 are gamma events which activate only a single tube per hit in the double layer structure, which are identified by the signal processing unit of the detector array as non-coincident hits. For moderate gamma-ray background radiation, it is rather unlikely that two coincident hits are caused by two gamma rays (which would generate a false positive). Hence, by triggering (i.e., passing data) only when two adjacent tubes in both layers of the double layer module are hit (referred to as "coincidence requirement"), we can eliminate many of non-coincident hits by the gamma ray and other background radiation from the data acquisition system, thereby not overloading the DAQ system with false muon detections.

For double-layer modules that use double coincidence to reject gamma hits is that, the double layer system may not behave well when some of the detectors (e.g., gas-filled drift tubes) are either "dead" or "hot" (i.e., have a high level of background noise). Because the "dead" tubes don't provide any hits, no coincidences can be detected and whole double-layered module becomes insensitive in the affected region. Multiple-hits system can include a built-in redundancy that addresses this problem.

In some implementations, a multiple-hits system operates with more than 2-layer modules (for example 4-, 6-, 8- or even 12-layer modules) to provide a higher multiplicity local coincidence which could increase gamma rejection and increase tracking efficiency. In general "multiple coincident hits" event is detected when three or more tubes (layers) are hit (near the same time) out of total number of layers in the module. For example, if the detection program requires "triple coincidence" in a 6-layer module, the system not only significantly reduces the number of random events (low probability of a gamma-ray event is cubed to provide a very low probability of false alarm), but also preserves a high efficiency of real event detection, because even when going through the "dead" tube, a muon will likely to generate 3 (out of 5 "alive") hits in other layers.

Furthermore, this condition of having multiple (>2) coincident hits can distinguish the passage of a muon from background gamma radiation with a higher rejection efficiency than double coincident hits events. This is because, a gamma ray hit will show up only in a single drift tube, while multiple gamma rays may show up as hits in different tubes but will not be correlated as a single muon traversing through a series of tubes. Note that by changing both total number of layers in the module design and number of hits in triggering mechanism, one can optimize the system performance within a broad range. Hence, a multiple coincidence system allows optimization of the performance for specific requirements of a nuclear reactor. Double coincidence can be seen as a base version of multiple coincidence, where both total number of layers and number of hits are set to 2.

In some implementations, the drift tube modules placed outside the reactor enclosure can be oriented to align with the incoming muon flux in a preferred direction, e.g., on paths intersecting the reactor enclosure volume. The solid angle for reactor imaging is rather limited due to the standoff between the reactor and the deployed detector arrays, so the desired events would be confined to a single module (one board) or two neighboring modules. With the new orientation, one can require multiple coincident hits within a single module in order to trigger the DAQ process. This allows a reduction of the noise induced by the gamma-rays.

Figure 3:
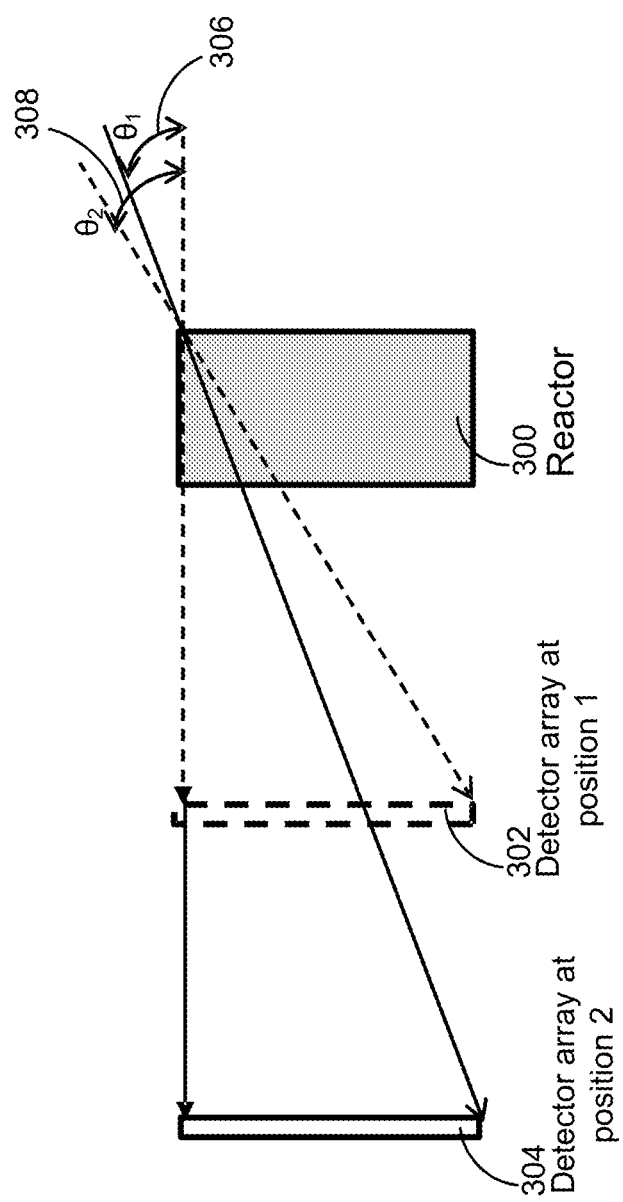
FIG. 3 shows the range of muon incidence angles that will be covered by a detector array vs. distances of the detector array placements from the reactor core.

FIG. 3 shows an exemplary range of muon incidence angles 306 and 308 that will be covered by an detector array vs. distances of the detector array placements from the reactor core on one side of the reactor. As illustrated, the closer the detector array is to the reactor, the greater range of muon incidence angles will be covered by the detector array. For example, a detector array 302 at position 1 as shown offers a greater angle coverage than a detector 304 at position 2. Thus, angle $\theta_2$ (308)>$\theta_1$ (306)). However, as the detector array is moved closer to the reactor 300, the amount of background radiation such as gamma flux may also increase, which can cause higher detector noise and have a negative effect on the detector lifetime.

Cosmic-ray muons are highly penetrative, and able to go through the reactor building. While muons can be significantly scattered by nuclear reactor fuels, a measurable fraction of the incident muons are absorbed by the reactor volume, so that they enter the reactor volume but do not exit. Hence, muon detector arrays can provide two sources of information: 1) absorption/attenuation of the muon flux from a particular direction; 2) scattering of the muons along the particular path. In some implementations, measurement of the absorption of incident muons may be combined with the measurement of scattering of the incident muon to identify the material inside the scattering volume. This additional information of the reactor fuel can be very useful, not only in diagnosis of fuel condition but also in verification that the reactor is operating with the proper (i.e., safe and/or legally authorized) fuel. Combining scattering with absorption of muons provides information in addition to the image of fuel location based on scattering alone, such as providing material identification in the region of the damaged reactor core.

In some implementations, measuring muon absorption requires measurement of the total muon flux incident on the reactor volume. Consider two detector arrays on opposite sides of a reactor enclosure. Because horizontally propagating cosmic rays are measured, each detector array actually "sees" particles propagating both toward the reactor volume (i.e., entering) and away from it (i.e., exiting). Muon absorption can be measured by comparing the muon flux entering and exiting the reactor volume as measured by each detector array separately, or by comparing the exiting flux on one detector array with the entering flux on the opposite detector array. Combining data from both detector arrays can be used to obtain both muon absorption and scattering signals, which can be used for material identification by combining these two signals.

Identification of material inside nuclear reactor can be an important step in an overall cleanup procedures following a nuclear reactor incident, such as the Fukushima Daiichi nuclear incident. Material identification will allow the investigator to evaluate status of the reactor core for each of the damaged reactors, such as what fraction of the core has been damaged. Understanding of the status of the core will allow for designing and executing appropriate cleanup plan for the damaged reactors. By utilizing the obtained reactor core images and the material identification information, the cleanup time may be significantly reduced, billions of dollars may be saved, and personnel exposure to radiation may be significantly reduced.

Figure 4:
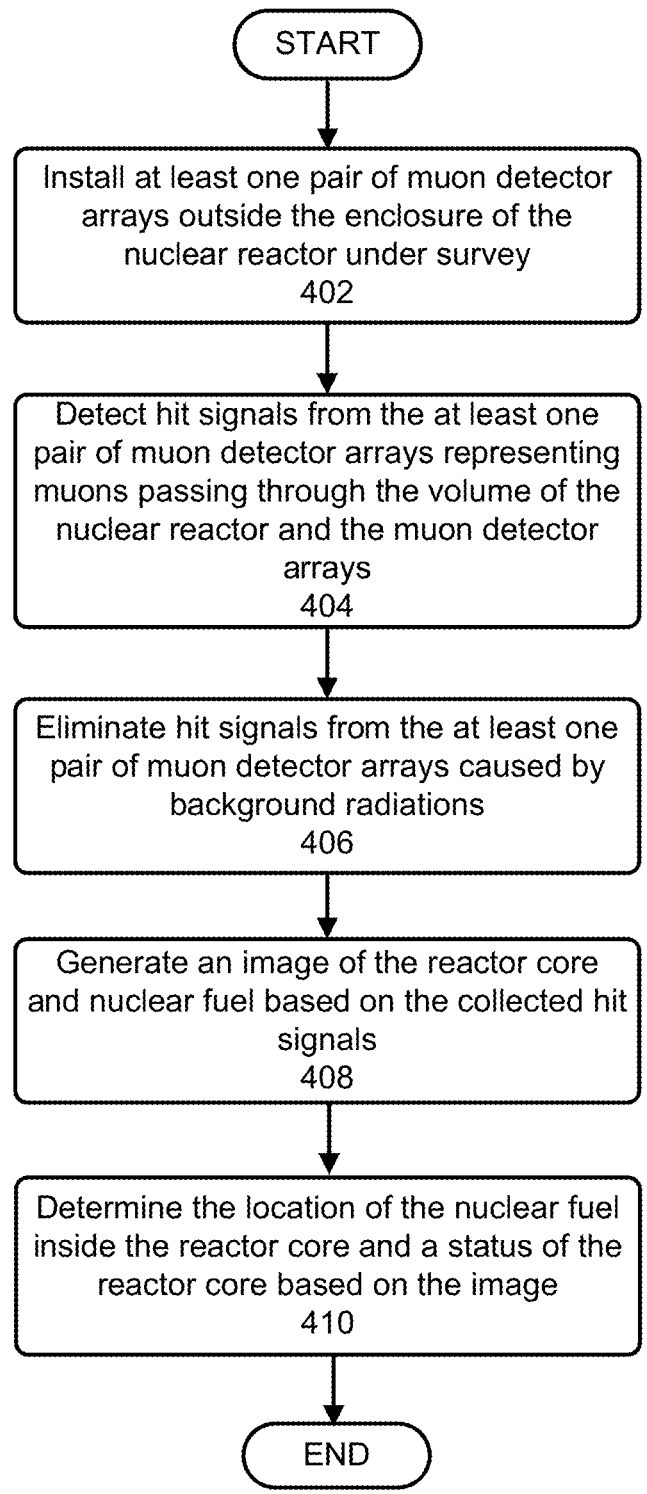
FIG. 4 presents a flowchart illustrating an exemplary process for imaging and monitoring a status of a reactor core inside a nuclear reactor.
Figure 5A:
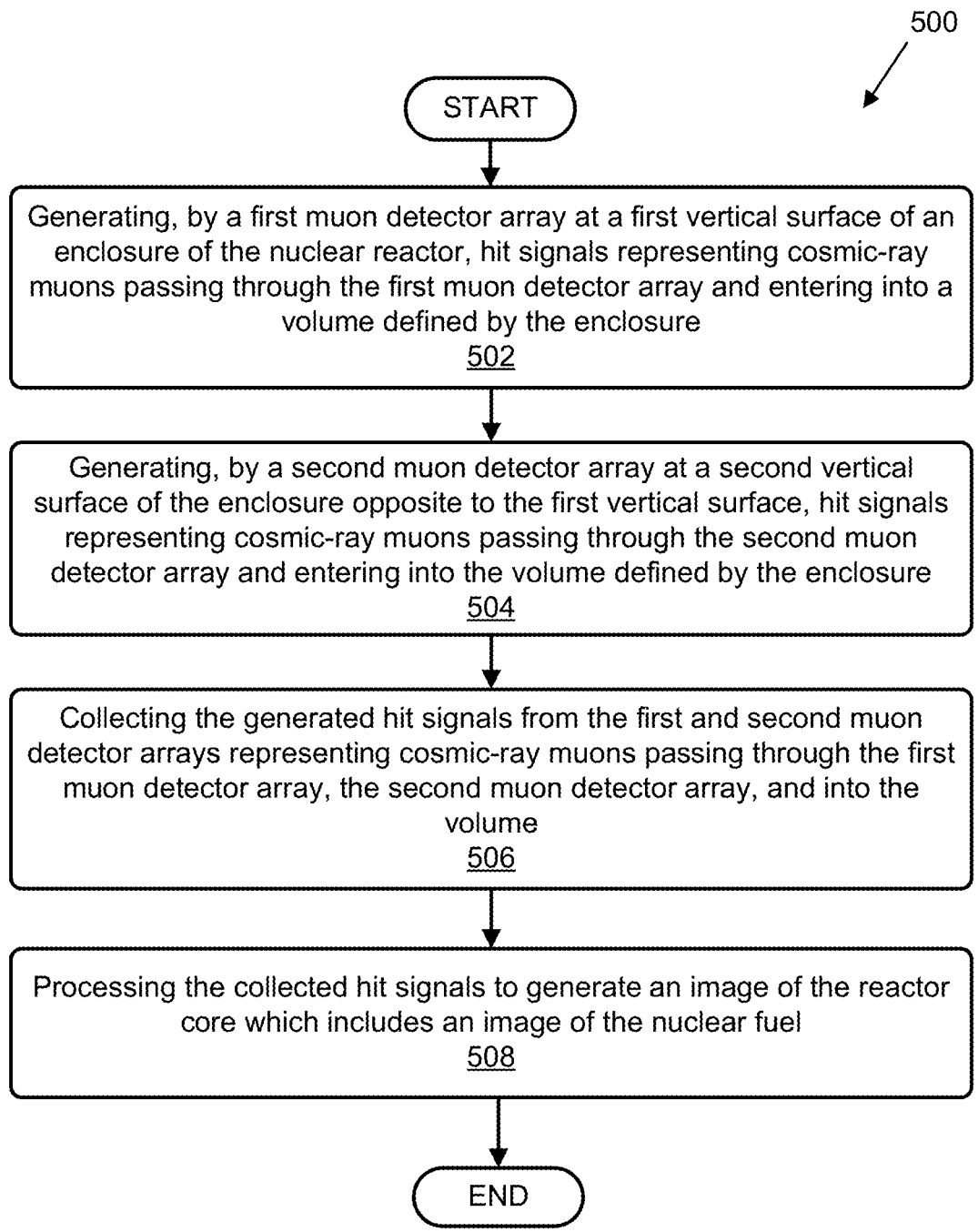
Figure 5B:
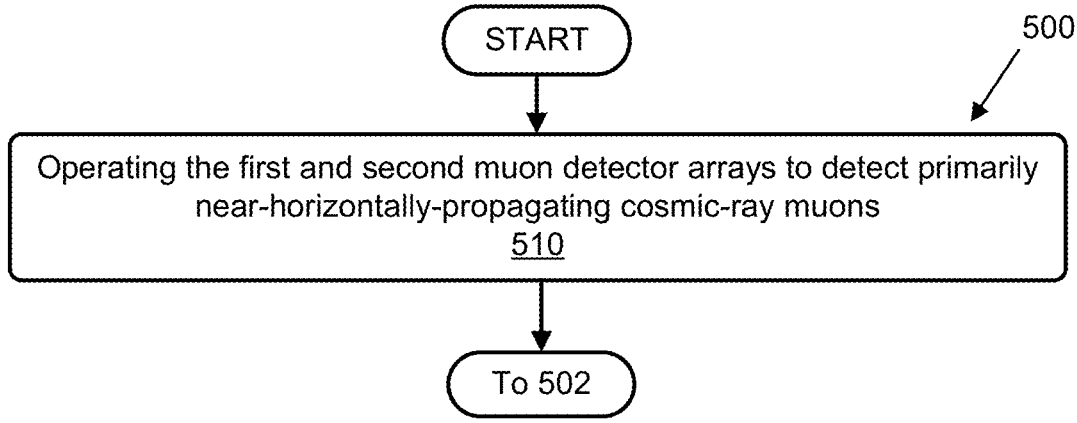
Figure 5C:
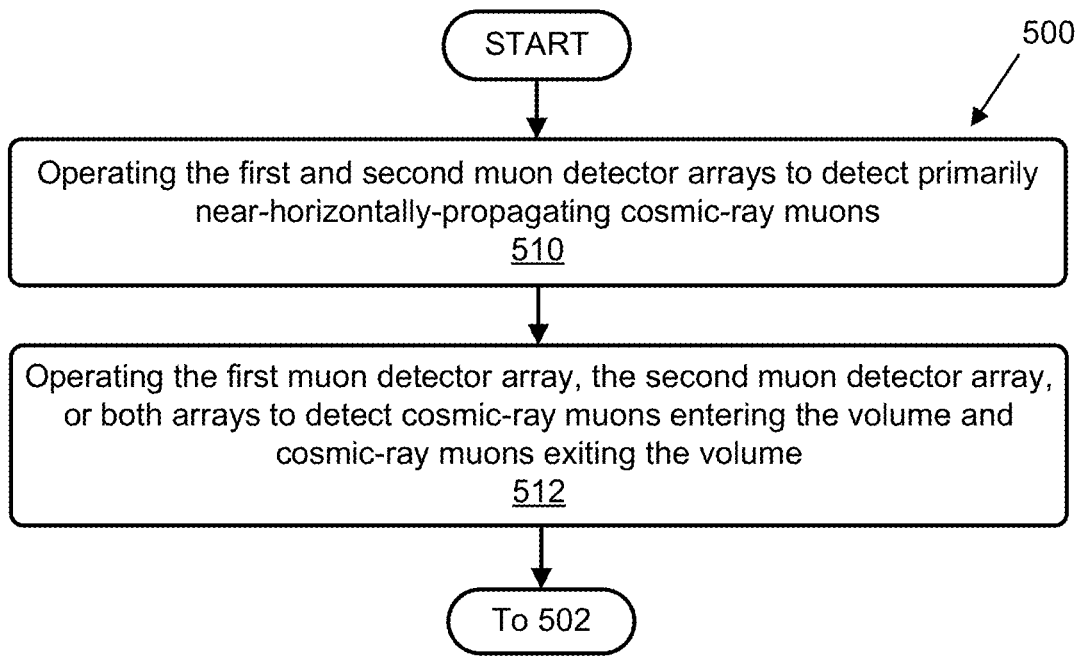
Figure 5D:
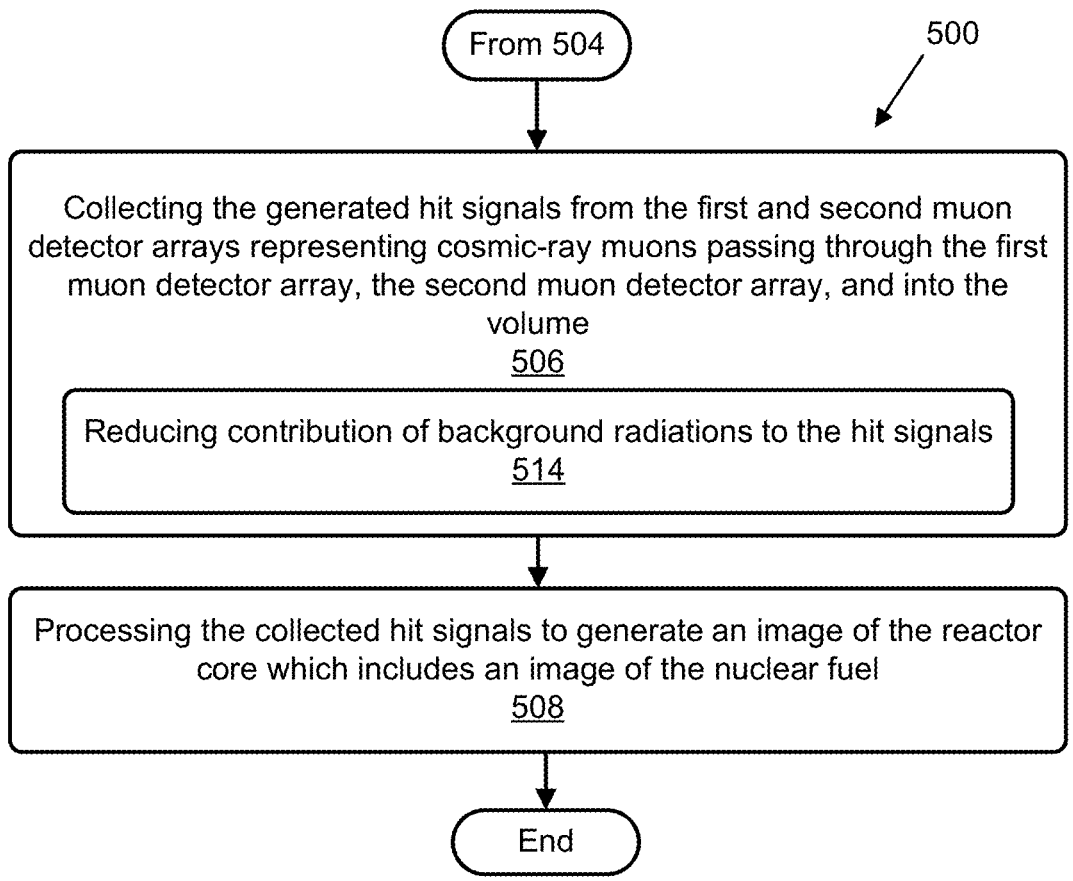
Figure 5E:
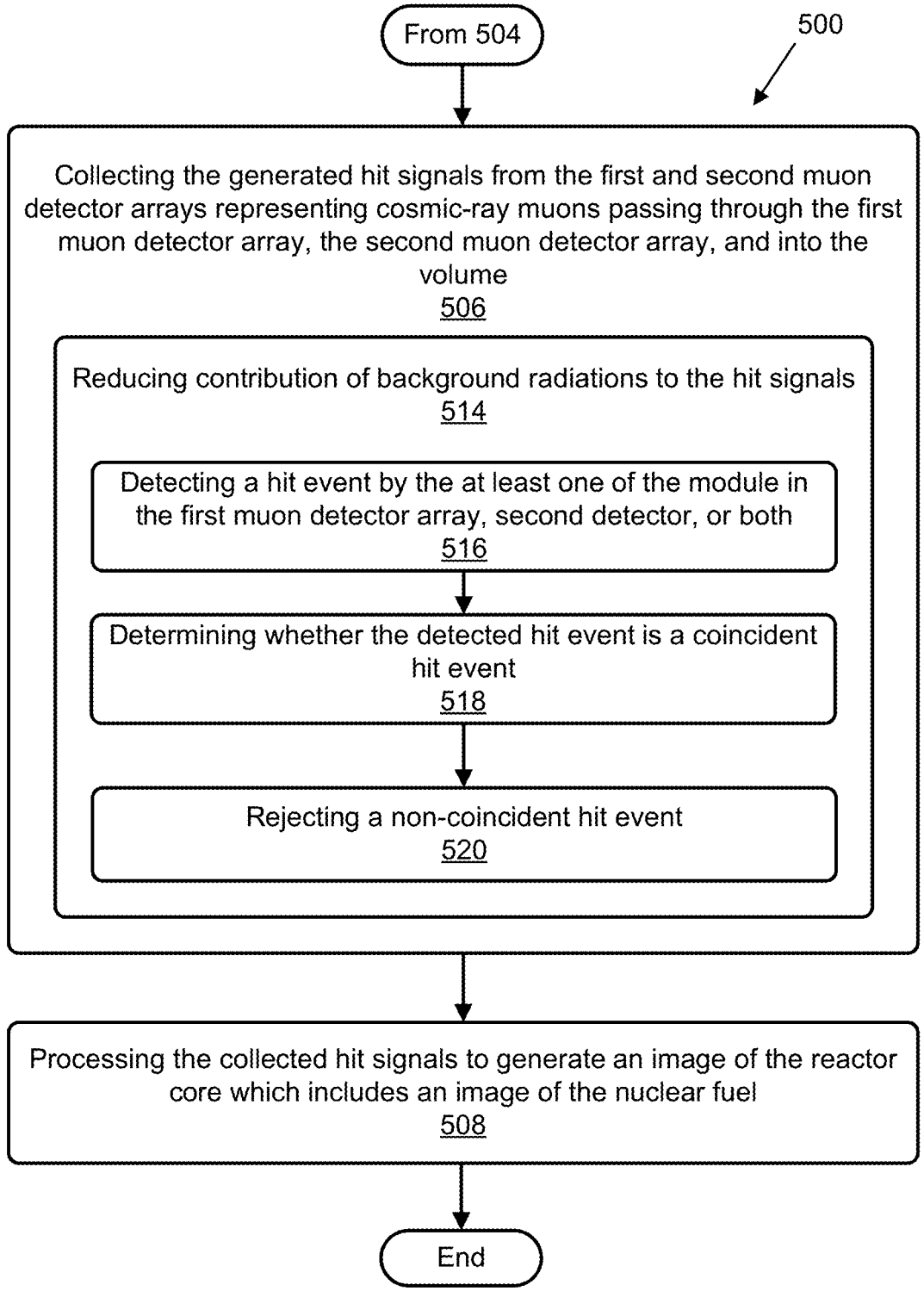
Figure 5F:
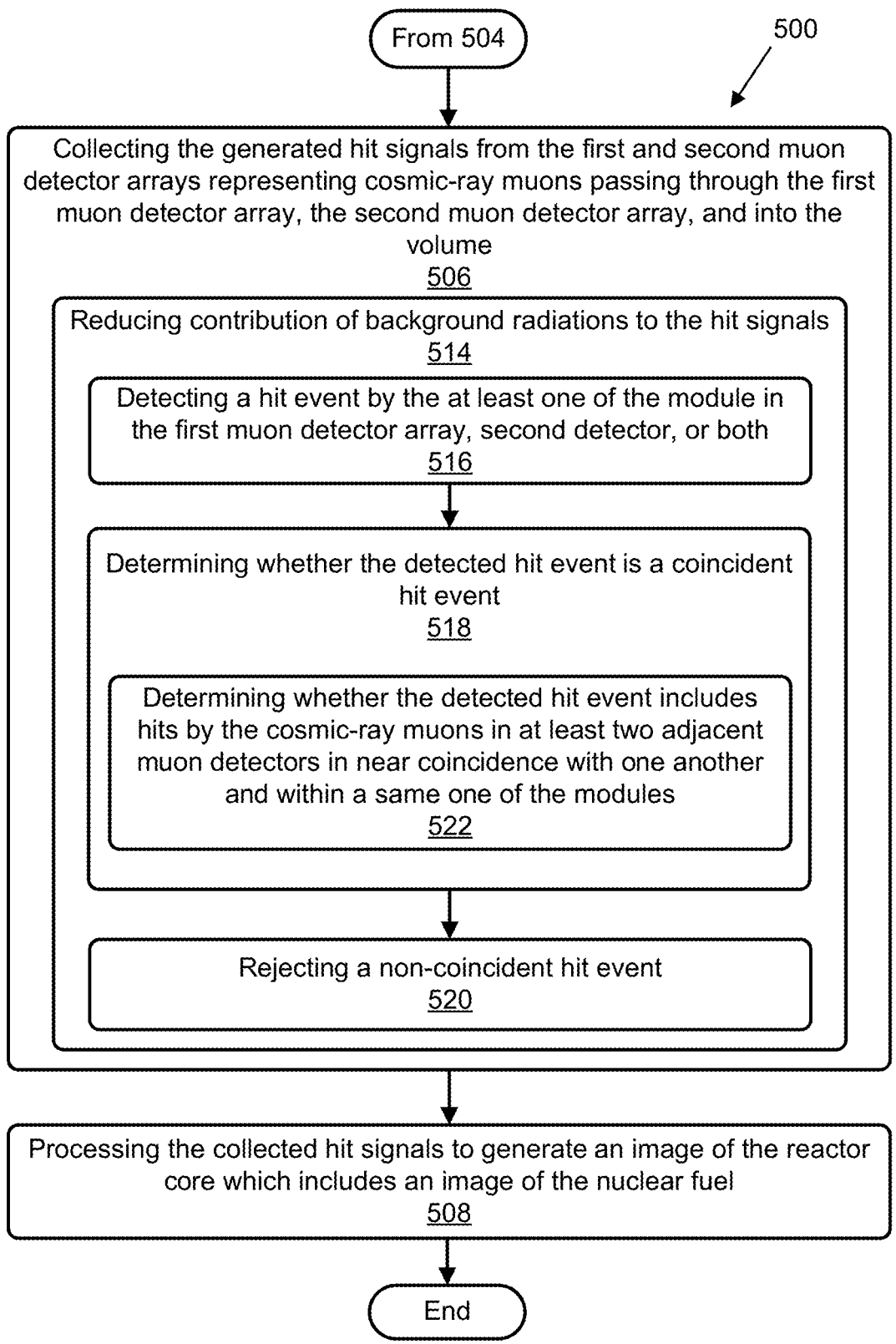
Figure 5G:
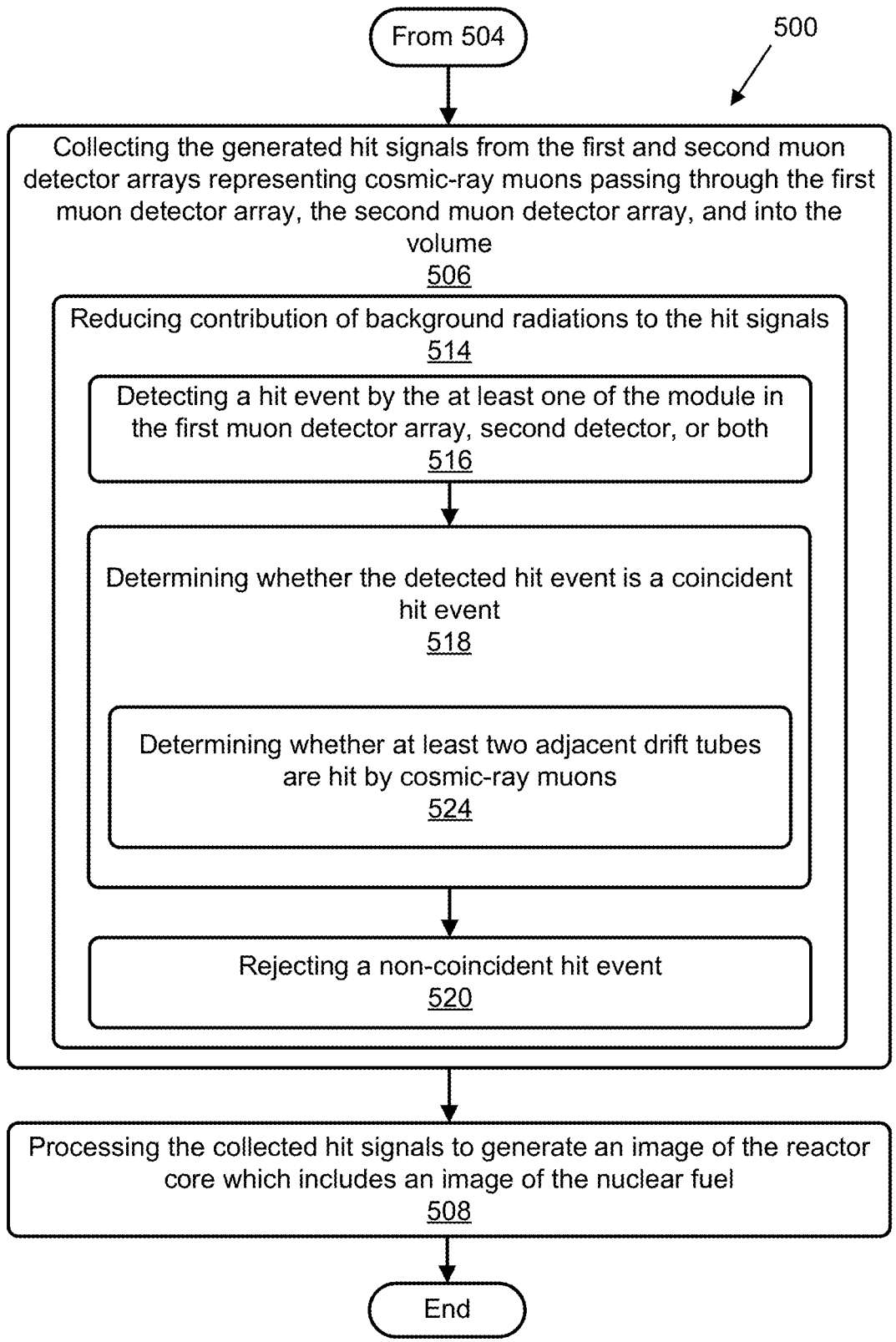
Figure 5I:
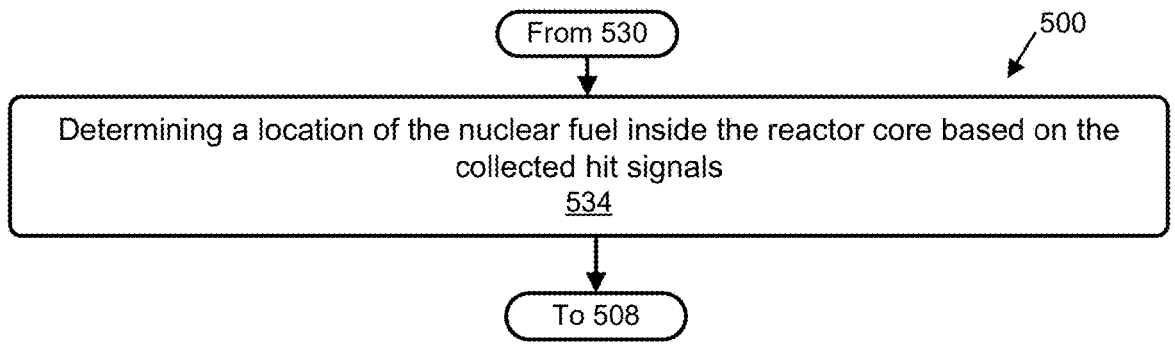
Figure 5J:
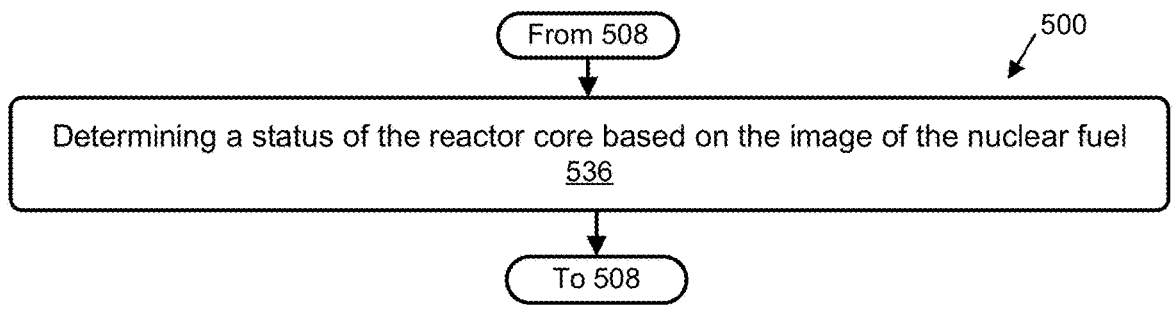
Figure 5K:
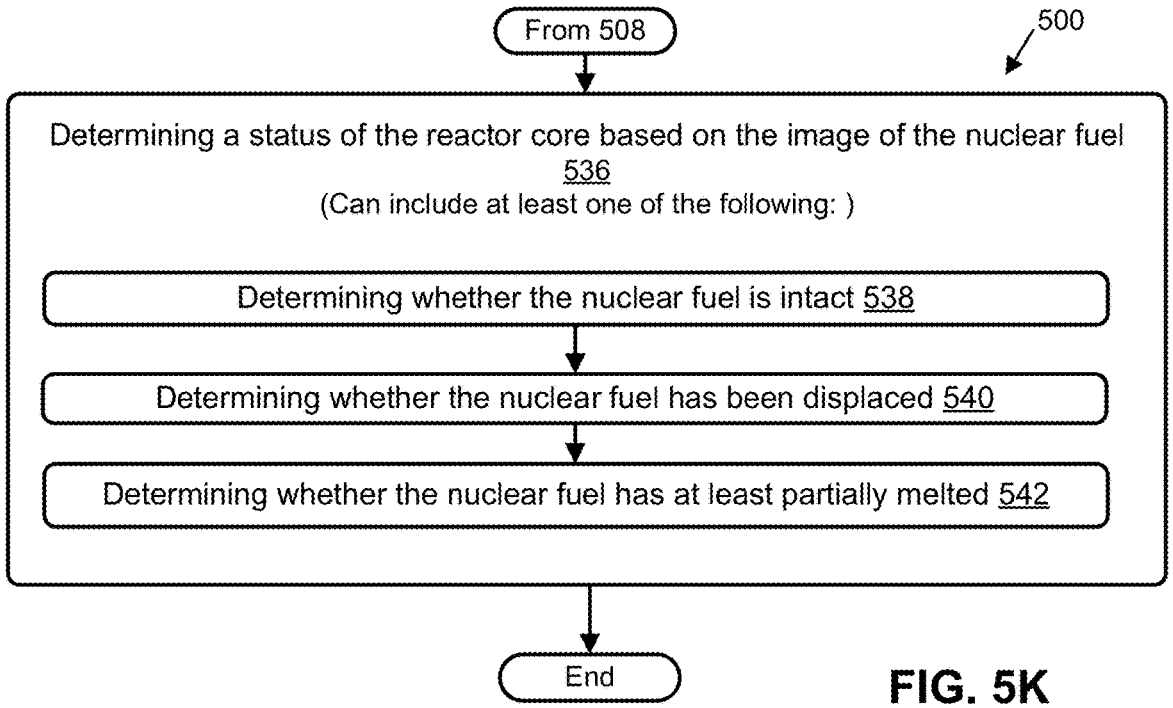
Figure 5L:
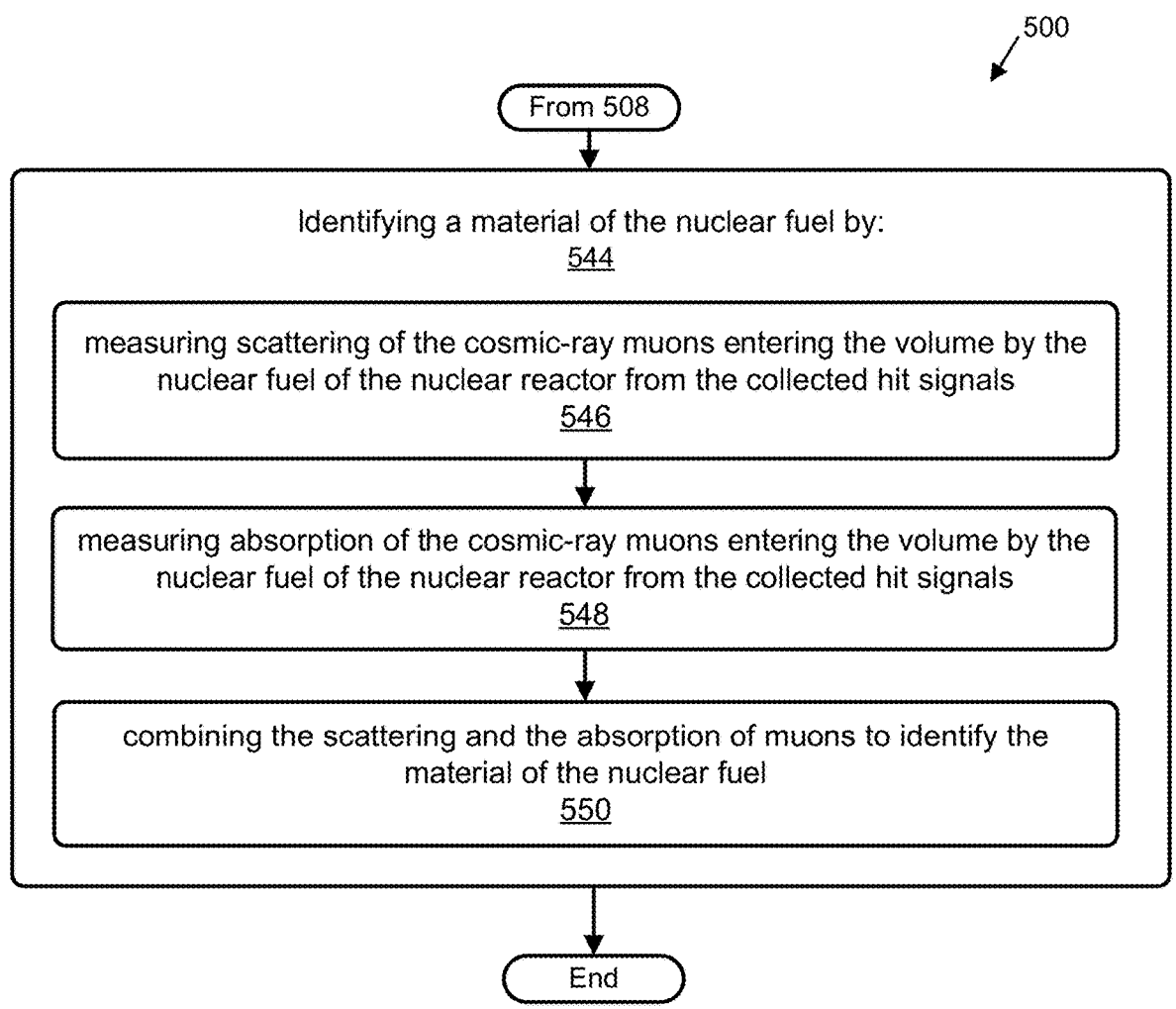

FIG. 4 presents a flowchart illustrating a process for imaging and monitoring the status of a reactor core inside a nuclear reactor in accordance with some embodiments described herein. To begin, at least one pair of muon detector arrays are installed outside the enclosure of the nuclear reactor under survey (402). In some implementations, the at least one pair of muon detector arrays includes two opposing detector arrays positioned on two opposing sides of the enclosure. One of the muon detector arrays is arranged in a first vertical plane substantially parallel to a first wall of the enclosure. The other muon detector array is arranged in a second vertical plane substantially parallel to a second wall of the enclosure, wherein the first vertical plane and the second vertical plane are substantially parallel to each other. In some implementations, the at least one pair of muon detector arrays includes two pairs of opposing detector arrays positioned on all four sides of the enclosure.

Next, the system detects hit signals from the at least one pair of muon detector arrays representing muons passing through the volume of the nuclear reactor and the muon detector arrays (404). Each of the muon detector arrays is configured to detect near-horizontally-propagating muons and muons both entering the volume of the nuclear reactor and exiting the volume of the nuclear reactor. The system then eliminates hit signals from the at least one pair of muon detector arrays caused by background radiations (406). For example, the system eliminates each hit event that is determined to be a non-coincident hit. Next, system generates an image of the reactor core based on the collected hit signals, wherein the image of the reactor core includes an image of the nuclear fuel inside the reactor core (408). In some implementations, the image of the reactor core includes a 3D image of the reactor core and the nuclear fuel. The system then determines the location of the nuclear fuel inside the reactor core and a status of the reactor core based on the image of the nuclear fuel (410). The status of the reactor core can include, but is not limited to: if the nuclear fuel is intact, if the nuclear fuel has been displaced; if the nuclear fuel has partially, significantly, or completely melted; and if melted, the location of the melted fuel.

FIGS. 5A, 5B, 5C, 5D, 5E, 5F, 5G, 5H, 5I, 5J, 5K, and 5L are process flow diagrams illustrating an exemplary process 500 performed by an exemplary charged particle tomography system. The process 500 as shown in FIGS. 5A, 5B, 5C, 5D, 5E, 5F, 5G, 5H, 5I, 5J, 5K, and 5L can include various combinations of features. In one aspect, a method for non-invasive imaging of a reactor core inside a nuclear reactor with the reactor core containing nuclear fuel is disclosed. The disclosed method includes generating, by a first muon detector array at a first vertical surface of an enclosure of the nuclear reactor, hit signals representing cosmic-ray muons passing through the first muon detector array and entering into a volume defined by the enclosure (502). The first muon detector array includes muon detectors arranged vertically along a first vertical plane substantially parallel to the first vertical surface of the enclosure. The disclose method includes generating, by a second muon detector array at a second vertical surface of the enclosure opposite to the first vertical surface, hit signals representing cosmic-ray muons passing through the second muon detector array and entering into the volume defined by the enclosure (504). The second muon detector array includes muon detectors arranged vertically along a second vertical plane substantially parallel to the second vertical surface of the enclosure. The first vertical plane and the second vertical plane are substantially parallel to each other and are at opposite sides of the nuclear reactor. The disclosed method includes collecting the generated hit signals from the first and second muon detector arrays representing cosmic-ray muons passing through the first muon detector array, the second muon detector array, and into the volume (506). The disclosed method includes processing the collected hit signals to generate an image of the reactor core which includes an image of the nuclear fuel (508).

The disclosed method can be implemented to include one or more of the following features. For example, the disclosed method can include operating the first and second muon detector arrays to detect primarily near-horizontally-propagating cosmic-ray muons (510). The disclosed method can include operating the first muon detector array, the second muon detector array, or both arrays to detect cosmic-ray muons entering the volume and cosmic-ray muons exiting the volume (512). Collecting the hit signals can include reducing contribution of background radiations to the hit signals (514). The background radiations can include gamma ray radiation. The background radiations can include background radiations generated inside the nuclear reactor, background radiations from an operating environment surrounding the nuclear reactor, or both. Generating the hit signals by the first muon detector array can includes generating the hit signals by at least one of modules in the first muon detector array. The muon detectors in the first muon detector array can be arranged into the modules in the first muon detector array. A given module in the first muon detector array can include two or more of the muon detectors in the first muon detector array. Generating the hit signals by the second muon detector array can include generating the hit signals by at least one of modules in the second muon detector array. The muon detectors in the second muon detector array can be arranged into the modules in the second muon detector array. A given module in the second muon detector array can include two or more of the muon detectors in the second muon detector array. Reducing the contribution of background radiations to the hit signals can include detecting a hit event by the at least one of the module in the first muon detector array, second detector, or both (516). Reducing the contribution of background radiations to the hit signals can include determining whether the detected hit event is a coincident hit event (518). Reducing the contribution of background radiations to the hit signals can include rejecting a non-coincident hit event (520). Determining whether the detected hit event is a coincident hit event can include determining whether the detected hit event includes hits by the cosmic-ray muons in at least two adjacent muon detectors in near coincidence with one another and within a same one of the modules (522). Determining whether the detected hit event is a coincident hit event can include determining whether at least two adjacent drift tubes are hit by cosmic-ray muons (524).

The disclosed method can be implemented in various ways to include one or more of the following features. For example, the disclosed method can include generating, by a third muon detector array at a third vertical surface of an enclosure of the nuclear reactor, hit signals representing cosmic-ray muons passing through the third muon detector array and into the volume defined by the enclosure (526). The third muon detector array includes muon detectors arranged vertically along a third vertical plane substantially parallel to the third vertical surface of the enclosure. The disclosed method can include generating, by a fourth muon detector array at a fourth vertical surface of an enclosure of the nuclear reactor, hit signals representing cosmic-ray muons passing through the fourth muon detector array and into the volume defined by the enclosure (528). The fourth muon detector array includes muon detectors arranged vertically along a fourth vertical plane substantially parallel to the fourth vertical surface of the enclosure. The third vertical plane and the fourth vertical plane are substantially parallel to each other and at opposing sides of the reactor. The disclosed method can include collecting the generated hit signals from the third and fourth muon detector arrays in addition to the collected hit signals from the first and second muon detector arrays (530 in addition to 506). The disclosed method can include processing the collected hit signals to generate the image of the reactor core which includes the image of the nuclear fuel includes generating the image of the reactor core based on the collected hit signals from the first, second, third and fourth muon detector arrays (532).

The disclosed method can include determining a location of the nuclear fuel inside the reactor core based on the collected hit signals (534). The disclosed method can include determining a status of the reactor core based on the image of the nuclear fuel (536). Determining the status of the reactor core can include at least one of determining whether the nuclear fuel is intact (538); determining whether the nuclear fuel has been displaced (540); or determining whether the nuclear fuel has at least partially melted (542). The disclosed method can include identifying a material of the nuclear fuel (544) by: measuring scattering of the cosmic-ray muons entering the volume by the nuclear fuel of the nuclear reactor from the collected hit signals (546); measuring absorption of the cosmic-ray muons entering the volume by the nuclear fuel of the nuclear reactor from the collected hit signals (548); and combining the scattering and the absorption of muons to identify the material of the nuclear fuel (550).

The disclosed technology for inspecting nuclear reactors can be used to measure conditions of the reactor cores at a nuclear plant, such as Fukushima Daiichi. Muons are deflected more strongly by heavy nuclei like uranium than by relatively lighter nuclei like the iron in steel or the elements in concrete, because multiple Coulomb scattering is approximately proportional to the nuclear charge. This effect gives muon tomography (MT) a greater advantage when compared to muon radiography (MR) for investigating the damaged reactors, because a map showing regions of large muon deflection can identify the location of uranium. The disclosed system and technique can provide images showing the location of fuel, and different statuses of the fuel, including but are not limited to: that the fuel is undamaged, that the fuel rods have been damaged and fuel has collected in lower regions of the pressure vessel, and that the fuel has melted down to the dry well. Measuring and establishing any of these conditions in a short time will provide valuable input for decisions about how to proceed with recovery and decommission of a damaged reactor such as those in Fukushima Daiichi. If it is determined that all of the fuel has been contained in the reactor pressure vessel (RPV), the cleanup and remediation of the site will be much less complex than if substantial fuel has leaked from the RPV and migrated to lower levels of the building. If there is extensive damage to the fuel of a nuclear reactor, the disclosed MT technique could be used to identify voids in the fuel structure, or abnormal presence of fuel in lower regions of the RPV. Also, the technique will yield a reliable measurement of the mass of uranium present in a given volume. Since the initial fuel load is known, measuring a deficit would indicate the amount of fuel that has escaped the reactor vessel.

The US Nuclear Regulatory Commission (NRC) has warned that there is a finite possibility that similar disasters to Fukushima Daiichi incident could take place at the US reactors. In an emergency situation like Fukushima Daiichi, the proposed system can provide significant information for assessing damage almost immediately. The disclosed system and technique will benefit American tax payers in providing a new technique that can be used to monitor the reactor cores of every nuclear-reactor site in the world, and that could have helped in the chaotic situation at Fukushima Daiichi and at Three Mile Island. When the disclosed MT is installed on a nuclear reactor, it can monitor the condition of the reactor and identify a potential reactor damage at a very early stage well before a serious incident will take place. Hence, the disclosed MT provides a way of assuring quality and proper functioning of the nuclear reactors.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendices.

What is claimed are techniques and structures as described and shown, including:

1. A method for non-invasive imaging of a reactor core inside a nuclear reactor, wherein the reactor core contains nuclear fuel, the method comprising:

generating, by a first muon detector array of a first pair of detector arrays at a first vertical surface of an enclosure of the nuclear reactor, hit signals representing cosmic-ray muons passing through the first muon detector array, entering or exiting near-horizontally a volume defined by the enclosure, and passing through a second muon detector array of the first pair of detector arrays, wherein the first muon detector array includes muon detectors arranged vertically along a first vertical plane substantially parallel to the first vertical surface of the enclosure;

generating, by the second muon detector array of the first pair of detector arrays at a second vertical surface of the enclosure opposite to the first vertical surface, hit signals representing cosmic-ray muons passing through the second muon detector array, entering or exiting near-horizontally the volume defined by the enclosure, and passing through the first muon detector array, wherein the second muon detector array includes muon detectors arranged vertically along a second vertical plane substantially parallel to the second vertical surface of the enclosure, and wherein the first vertical plane and the second vertical plane are substantially parallel to each other and are at opposite sides of the nuclear reactor;

generating, by a third muon detector array of a second pair of detector arrays at a third vertical surface of an enclosure of the nuclear reactor, hit signals representing cosmic-ray muons passing through the third muon detector array, entering into the volume defined by the enclosure, and passing through a fourth muon detector array of the second pair of detector arrays, wherein the third muon detector array includes muon detectors arranged vertically along a third vertical plane that intersects the first vertical plane, the third vertical plane being substantially parallel to the third vertical surface of the enclosure;

generating, by the fourth muon detector array of the second pair of detector arrays at a fourth vertical surface of an enclosure of the nuclear reactor, hit signals representing cosmic-ray muons passing through the fourth muon detector array, entering into the volume defined by the enclosure, and passing through the third muon detector array, wherein the fourth muon detector array includes muon detectors arranged vertically along a fourth vertical plane substantially parallel to the fourth vertical surface of the enclosure, and wherein the third vertical plane and the fourth vertical plane are substantially parallel to each other and at opposing sides of the reactor;

collecting the generated hit signals from the first, the second, the third, and the fourth muon detector arrays representing at least cosmic-ray muons passing through the first muon detector array, the second muon detector array, and into the volume and passing through the third muon detector array, the fourth muon detector array, and into the volume;

processing the collected hit signals to generate an image of the reactor core which includes an image of the nuclear fuel for determining a status of the reactor core.

2. The method of claim 1, comprising:
operating the first muon detector array and the second muon detector array to detect cosmic-ray muons entering the volume and cosmic-ray muons exiting the volume.

3. The method of claim 1, wherein collecting the hit signals includes:
reducing contribution of background radiations to the hit signals.

4. The method of claim 3, wherein the background radiations include gamma ray radiation.

5. The method of claim 3, wherein the background radiations include background radiations generated inside the nuclear reactor, background radiations from an operating environment surrounding the nuclear reactor, or both.

6. The method of claim 3, wherein:
generating the hit signals by the first muon detector array includes generating the hit signals by at least one of modules in the first muon detector array, wherein the muon detectors in the first muon detector array are arranged into the modules in the first muon detector array, and wherein a given module in the first muon detector array includes two or more of the muon detectors in the first muon detector array; and
generating the hit signals by the second muon detector array includes generating the hit signals by at least one of modules in the second muon detector array, wherein the muon detectors in the second muon detector array are arranged into the modules in the second muon detector array, and wherein a given module in the second muon detector array includes two or more of the muon detectors in the second muon detector array.

7. The method of claim 6, wherein reducing the contribution of background radiations to the hit signals includes:
detecting a hit event by the at least one of the module in the first muon detector array, second detector, or both;
determining whether the detected hit event is a coincident hit event; and
rejecting a non-coincident hit event.

8. The method of claim 7, wherein determining whether the detected hit event is a coincident hit event includes:
determining whether the detected hit event includes hits by the cosmic-ray muons in at least two adjacent muon detectors in near coincidence with one another and within a same one of the modules.

9. The method of claim 7, wherein determining whether the detected hit event is a coincident hit event includes determining whether at least two adjacent drift tubes are hit by cosmic-ray muons.

10. The method of claim 1, comprising determining a location of the nuclear fuel inside the reactor core based on the collected hit signals.

11. The method of claim 1, wherein determining the status of the reactor core includes at least one of:
determining whether the nuclear fuel is intact;
determining whether the nuclear fuel has been displaced; or
determining whether the nuclear fuel has at least partially melted.

12. A system for performing non-invasive imaging or monitoring of a reactor core inside a nuclear reactor, wherein the reactor core contains nuclear fuel, the system comprising:
muon detector arrays placed outside an enclosure of a nuclear reactor to detect hit events, and generate hit signals associated with detected hit events, wherein the muon detector arrays include a first pair of detector array that comprises:
a first muon detector array at a first surface of the enclosure, wherein the first muon detector array includes muon detectors arranged vertically along a first vertical plane substantially parallel to the first surface of the enclosure; and
a second muon detector array at a second surface of the enclosure opposite to the first surface, wherein the second muon detector array includes muon detectors arranged vertically along a second vertical plane substantially parallel to the second surface of the enclosure, wherein the first vertical plane and the second vertical plane are substantially parallel to each other and are at opposite sides of the nuclear reactor; and
a second pair of detector array that comprises:
a third muon detector array at a third vertical surface of an enclosure of the nuclear reactor, the third muon detector configured to generate hit signals representing cosmic-ray muons passing through the third muon detector array, entering into the volume defined by the enclosure, and passing through a fourth muon detector array, wherein the third muon detector array includes muon detectors arranged vertically along a third vertical plane that intersects the first vertical plane, the third vertical plane being substantially parallel to the third vertical surface of the enclosure; and
the fourth muon detector array at a fourth vertical surface of an enclosure of the nuclear reactor, the fourth muon detector array configured to generate hit signals representing cosmic-ray muons passing through the fourth muon detector array, entering into the volume defined by the enclosure, and passing through the third muon detector array, wherein the fourth muon detector array includes muon detectors arranged vertically along a fourth vertical plane substantially parallel to the fourth vertical surface of the enclosure, and wherein the third vertical plane and the fourth vertical plane are substantially parallel to each other and at opposing sides of the reactor;
a signal processor communicatively coupled to the first, the second, the third, and the fourth muon detector arrays, the signal processor configured to:
collect the generated hit signals from the first and second muon detector arrays representing at least cosmic-ray muons passing through the first and second muon detector arrays and entering or exiting near-horizontally a volume of the nuclear reactor defined by the enclosure and the hit signals from the third and fourth muon detector arrays representing cosmic-ray muons passing through the third and fourth muon detector arrays and entering or exiting near-horizontally the volume of the nuclear reactor; and
an image processor communicatively coupled to the signal processor and configured to generate an image of the reactor core based on the collected hit signals, wherein the image of the reactor core includes an image of the nuclear fuel for determining a status of the reactor core.

13. The system of claim 12, wherein the first muon detector array and the second muon detector array are configured to detect cosmic-ray muons entering the volume of the nuclear reactor and cosmic-ray muons exiting the volume of the nuclear reactor.

14. The system of claim 12, comprising:
passive shielding to enclose the detector arrays to shield the detector arrays from background radiations.

15. The system of claim 12, wherein the signal processor is configured to reduce contribution of background radiations to the hit signals collected from the first and second muon detector arrays.

16. The system of claim 15, wherein the background radiations include gamma ray radiation and other background radiations.

17. The system of claim 15, wherein the background radiations include background radiations generated inside the nuclear reactor and background radiations from an operating environment surrounding the nuclear reactor.

18. The system of claim 12, wherein the image processor is further configured to determine a location of the nuclear fuel inside the reactor core based on the collected hit signals.

19. The system of claim 12, wherein the status of the reactor core includes at least one of:
whether the nuclear fuel is intact;
whether the nuclear fuel has been displaced; or
whether the nuclear fuel has at least partially melted.

20. A system for non-invasive inspecting a damaged reactor core inside a nuclear reactor, comprising:
charged particle detector arrays placed outside an enclosure of the damaged nuclear reactor to generate charged particle signals representing charged particles passing through the charged particle detector arrays, entering or exiting near-horizontally a volume defined by the enclosure, and interacting with nuclear fuel inside the damaged reactor core, wherein the charged particle detector arrays include a first pair of detector arrays that comprises:
a first charged particle detector array at a first position outside the enclosure, wherein the first charged particle detector array is arranged in a first vertical plane substantially parallel to a first vertical surface of the enclosure; and
a second charged particle detector array at a second position outside the enclosure opposite to the first position, wherein the second charged particle detector array is arranged in a second vertical plane substantially parallel to a second vertical surface of the enclosure, wherein the first vertical plane and the second vertical plane are substantially parallel to each other and are at opposite sides of the nuclear reactor; and
a second pair of detector array that comprises:
a third charged particle detector array at a third position outside the enclosure, wherein the third charged particle detector is arranged in a third vertical plane that intersects the first vertical plane, the third vertical plane being substantially parallel to a third vertical surface of the enclosure; and
a fourth charged particle detector array at a fourth position outside the enclosure opposite to the third position, wherein the fourth charged particle detector array is arranged in a fourth vertical plane substantially parallel to a fourth vertical surface of the enclosure, wherein the third vertical plane and the fourth vertical plane are substantially parallel to each other and are at opposite sides of the nuclear reactors;
a signal processor communicatively coupled to the first, the second, the third and the fourth charged particle detector arrays to collect the generated charged particle signals from the first and second charged particle detector arrays and from the third and fourth charged particle detector arrays; and
a processor communicatively coupled to the signal processor and configured to perform operations including:
generate an image of the damaged reactor core based on the collected charged particle signals, wherein the generated image of the damaged reactor core includes an image of the nuclear fuel inside the damaged reactor; and
analyze the image of the nuclear fuel to determine a status of the damaged reactor core including at least one of:
whether the nuclear fuel is damaged;
whether the nuclear fuel has been displaced; or
whether the nuclear fuel has at least partially melted.

21. The system of claim 20, wherein the first and second muon detector arrays are configured to detect both cosmic-ray muons entering the damaged nuclear reactor and cosmic-ray muons exiting the damaged reactor core.

22. The system of claim 20, wherein system is configured to non-invasively inspect the damaged reactor core from outside the enclosure of the damaged rector core.

* * * * *